US010454778B2

(12) United States Patent
Rizqi et al.

(10) Patent No.: US 10,454,778 B2
(45) Date of Patent: Oct. 22, 2019

(54) POLICY-BASED COMPUTATION AND STORAGE OF CLOUD-BASED COLLABORATION OBJECTS

(71) Applicant: Box, Inc., Redwood City, CA (US)

(72) Inventors: Muhammad Ashar Rizqi, San Jose, CA (US); Jeffrey R. Queisser, San Francisco, CA (US); Benjamin C. Smith, Mountain View, CA (US); Kevin M. Greenan, Santa Cruz, CA (US)

(73) Assignee: Box, Inc., Redwood City, CA (US)

( * ) Notice: Subject to any disclaimer, the term of this patent is extended or adjusted under 35 U.S.C. 154(b) by 228 days.

(21) Appl. No.: 15/240,875

(22) Filed: Aug. 18, 2016

(65) Prior Publication Data

US 2016/0359684 A1 Dec. 8, 2016

Related U.S. Application Data

(63) Continuation-in-part of application No. 14/727,777, filed on Jun. 1, 2015.
(Continued)

(51) Int. Cl.
*G06F 15/173* (2006.01)
*H04L 12/24* (2006.01)
(Continued)

(52) U.S. Cl.
CPC .......... *H04L 41/147* (2013.01); *G06F 3/0604* (2013.01); *G06F 3/067* (2013.01);
(Continued)

(58) Field of Classification Search
CPC ....... H04L 41/147; H04L 41/08; H04L 67/16; H04L 67/1097; G06F 9/44505;
(Continued)

(56) References Cited

U.S. PATENT DOCUMENTS 7,600,229 B1 * 10/2009 Shmuylovich .......... G06F 9/505
718/104
8,249,917 B1 * 8/2012 Kassmann ......... G06Q 30/0601
705/12
(Continued)

OTHER PUBLICATIONS

"EMC VIPR Controller: Automate and Simplify Storage Management Datasheet", Jan. 2015.
(Continued)

*Primary Examiner* — Richard G Keehn
(74) *Attorney, Agent, or Firm* — Vista IP Law Group, LLP

(57) ABSTRACT

One or more servers are deployed in a cloud-based environment such that the cloud-based servers are configured to interface with one or more object processing target sites. In response to an object processing command, various combinations of feasible activities to perform at feasible target sites (e.g., object processing sites) are considered so as to generate object processing scenarios capable of executing object processing commands while observing constraints that may derive from the nature of, and/or attributes pertaining to the object processing sites. A scenario including a determination of one or more target sites is selected from the considered object processing scenarios. The selected one or more target sites are used to activate the object processing commands (e.g., for computation and/or for storage activities). A target site may be a country or state or other jurisdiction that inures benefits (e.g., tax benefits) and/or limitations (e.g., import/export limitations) pertaining to specific activities.

29 Claims, 23 Drawing Sheets

Related U.S. Application Data

(60) Provisional application No. 62/007,101, filed on Jun. 3, 2014.

(51) Int. Cl.
  *G06F 3/06* (2006.01)
  *H04L 29/08* (2006.01)
  *G06F 9/445* (2018.01)

(52) U.S. Cl.
  CPC .......... *G06F 3/0644* (2013.01); *G06F 3/0659* (2013.01); *G06F 9/44505* (2013.01); *H04L 67/1097* (2013.01); *H04L 67/16* (2013.01); *H04L 41/0803* (2013.01)

(58) Field of Classification Search
  CPC ...... G06F 3/067; G06F 3/0644; G06F 3/0604; G06F 3/0659
  See application file for complete search history.

(56) References Cited

U.S. PATENT DOCUMENTS

| | | | | |
|---|---|---|---|---|
| 8,578,387 | B1* | 11/2013 | Mills | G06F 9/5044 718/105 |
| 2007/0179995 | A1* | 8/2007 | Prahlad | G06F 3/0605 |
| 2010/0332401 | A1 | 12/2010 | Prahlad | |
| 2011/0078303 | A1* | 3/2011 | Li | G06F 9/505 709/224 |
| 2011/0119328 | A1* | 5/2011 | Simitci | G06F 3/0611 709/203 |
| 2012/0110594 | A1* | 5/2012 | Talpes | G06F 9/505 718/105 |
| 2012/0324444 | A1* | 12/2012 | Gulati | G06F 9/5088 718/1 |
| 2013/0138649 | A1 | 5/2013 | Broberg | |
| 2014/0101226 | A1* | 4/2014 | Khandekar | H04L 67/1008 709/203 |
| 2014/0267571 | A1* | 9/2014 | Periyannan | H04N 7/15 348/14.08 |
| 2014/0279581 | A1* | 9/2014 | Devereaux | G06Q 50/184 705/310 |
| 2015/0199367 | A1 | 7/2015 | Hammer | |
| 2016/0191635 | A1 | 6/2016 | Greenan | |

OTHER PUBLICATIONS

Notice of Allowance dated Mar. 13, 2018 for U.S. Appl. No. 14/727,777.

Preinterview First Office Action dated Jul. 26, 2017 for U.S. Appl. No. 14/727,777.

* cited by examiner

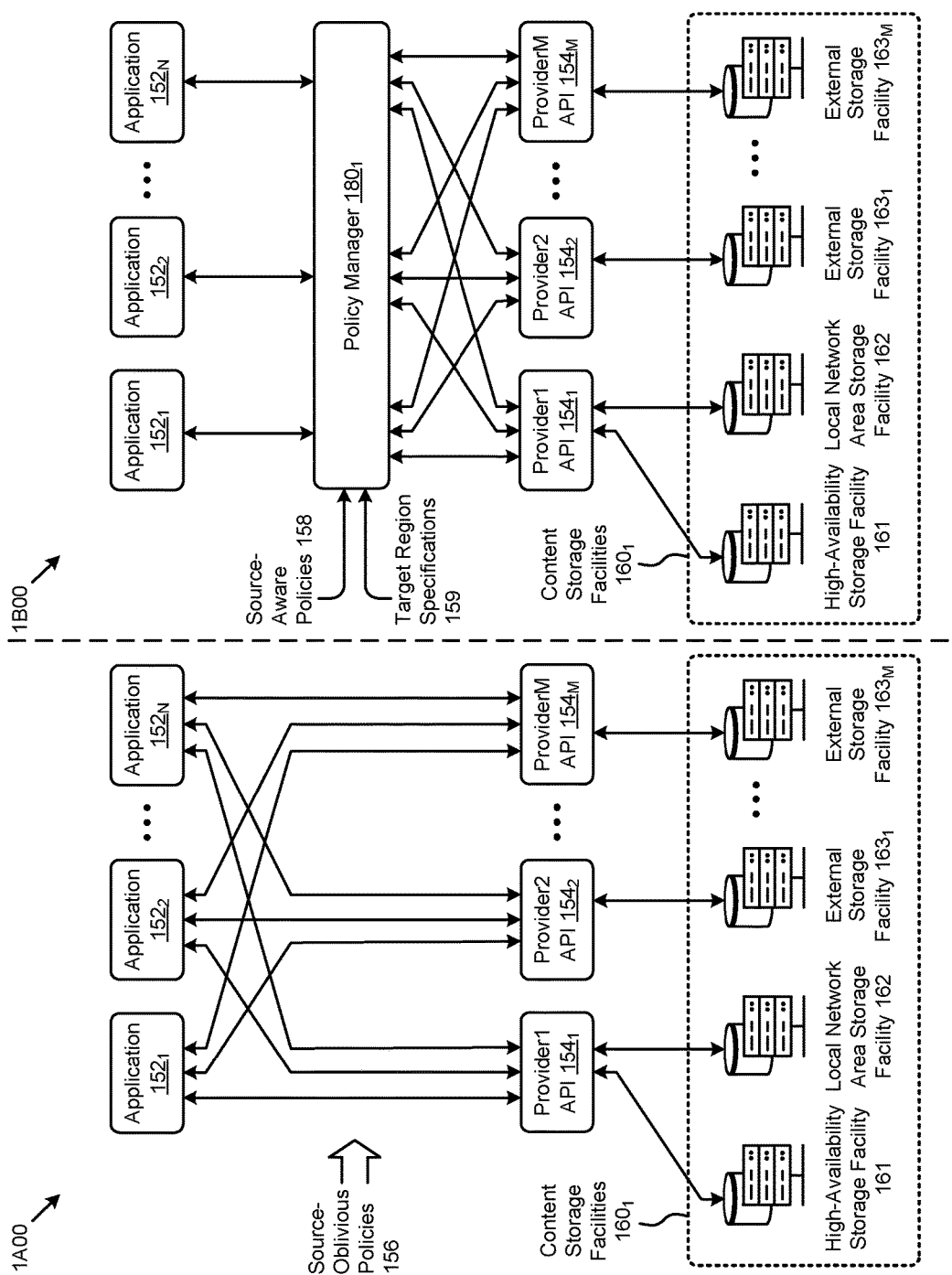

POLICY-BASED COMPUTATION AND STORAGE OF CLOUD-BASED COLLABORATION OBJECTS

RELATED APPLICATIONS

The present application is a continuation-in-part of U.S. patent application Ser. No. 14/727,777 titled, "ACCESSING MULTIPLE CONTENT STORAGE FACILITIES USING SOURCE-AWARE STORAGE POLICIES" filed Jun. 1, 2015, which claims the benefit of priority to U.S. Patent Application Ser. No. 62/007,101 titled, "POLICY-BASED FLEXIBLE STORAGE ROUTING ARCHITECTURE IN A CLOUD COLLABORATION PLATFORM" filed Jun. 3, 2014, each of which are hereby incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of cloud-based storage systems, and more particularly to techniques for performing policy-based computation and storage of cloud-based collaboration objects.

BACKGROUND

The proliferation of cloud-based services and platforms continues to increase. Specifically, cloud-based storage systems have impacted the way personal and corporate information (e.g., content) are stored, and has also impacted the way personal and corporate information are shared and managed. Using a cloud-based storage service can facilitate efficient use of cloud-based content management resources (e.g., storage facilities, compute facilities, etc.) for storing and/or processing digital content (e.g., "files"). For example, a cloud-based storage service might store content from a client in Europe in a storage facility in Europe, and the same cloud-based storage service might also store content from a client in the U.S. in a storage facility in the U.S. Further, the cloud-based storage service might process (e.g., search) content in the U.S. and store the derived content (e.g., search results) in Europe.

Where and how content is accessed, processed and/or stored is specified in part by storage policies defined by various stakeholders in the cloud-based storage ecosystem (e.g., the client, the cloud-based storage service provider, the storage facility provider, etc.) based at least in part on various policy objectives (e.g., security, accessibility, loss protection, cost, performance, etc.). These stakeholders desire to have storage policy flexibility so as to continually meet or exceed changing objectives.

As the number of cloud-based content management resource options (e.g., locations, sites, etc.) and complexity of policy objectives increase, however, maintaining the desired storage policy flexibility can be difficult. Some legacy approaches provide to clients an application programming interface (API) for each available content management resource. Such legacy approaches require, for example, that the client determine a priori the target storage facility and develop facility-specific storage commands and policies. These approaches also do not consider varying source attributes (e.g., client locations, enterprise service level agreements (SLAs), enterprise tariffs, jurisdictional statutes, etc.) when determining what computation and/or storage policies to observe. Further, such approaches result in large, customized programming code bases that are difficult to maintain (e.g., to update when physical storage components are change).

Other legacy approaches provide to clients a translation of storage commands targeted for one storage facility to storage commands for another storage facility. This approach is also based at least in part on facility-specific commands and policies, and fails to consider source attributes when applying such policies. The foregoing legacy approaches can also present limitations at least as pertaining to selecting from among the feasible content management resource facilities to carry out a given object processing scenario. For example, when two or more object processing scenarios are feasible given the policy or policies for the object, users desire to select the scenario having the highest probability of achieving certain objectives, such as minimizing costs and/or maximizing performance.

The problem to be solved is therefore rooted in technological limitations of the legacy approaches. Improved techniques, in particular improved application of technology, are needed to address the problem of using various cloud-based content management resources with source-aware and jurisdiction-aware commands and policies. More specifically, the technologies applied in the aforementioned legacy approaches fail to achieve sought-after capabilities of the herein disclosed techniques for performing policy-based computation and storage over cloud-based collaboration objects. What is needed is a technique or techniques to improve the application and efficacy of various technologies as compared with the application and efficacy of legacy approaches.

SUMMARY

The present disclosure provides systems, methods, and computer program products suited to address the aforementioned issues with legacy approaches. More specifically, the present disclosure provides a detailed description of techniques used in systems, methods, and in computer program products for performing policy-based decisions that determine the types and locations of computation and storage when dealing with cloud-based collaboration objects across diverse regimes. Certain embodiments are directed to technological solutions for dynamically determining operations to be performed at a selected collection of cloud-based content management resource sites using a policy management layer to apply storage policies based in part on source attributes, which embodiments advance the relevant technical fields, as well as advancing peripheral technical fields.

The disclosed embodiments modify and improve over legacy approaches. In particular, the herein-disclosed techniques provide technical solutions that address the technical problems attendant to using various cloud-based content management resources with resource-agnostic and source-aware commands and policies, and such technical solutions serve to reduce use of computer memory, reduce demand for computer processing power, and reduce communication overhead that is needed. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in the technical fields of distributed storage.

Some embodiments commence upon deploying a server in a cloud-based environment such that the server is configured to interface with one or more storage facilities that are accessible over a network by the server to provide cloud-based storage services in response to storage commands originating from a user device. The deployed server is connected to the network such that the server receives storage commands that pertain to one or more source objects that are associated with a set of source attributes. A policy manager applies one or more storage policies by determining a set of storage policies based at least in part on the one or more associated sources and/or target attributes. The policy manager accesses a routing table of target storage locations and sends the source objects over the network to one or more of the target storage locations based on target-specific constraints and/or one or more optimization functions.

Some embodiments commence upon deploying a server in a cloud-based environment such that the server is configured to interface with one or more content management resource sites, that are accessible over a network by the server, to provide cloud-based storage services in response to an object processing command originating from a user device. The deployed server is connected to the network such that the server receives object processing commands. Various combinations of feasible object processing sites are used to generate object processing scenarios capable of executing the object processing commands. A scenario is selected from the object processing scenarios to execute the object processing commands based at least in part on one or more objectives.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 1A depicts a provider-oriented multi-path approach for accessing multiple content storage facilities.

FIG. 1B depicts a resource-agnostic approach for accessing cloud-based content management resources using source-aware storage policies, according to an embodiment.

DETAILED DESCRIPTION

Figure 1C:
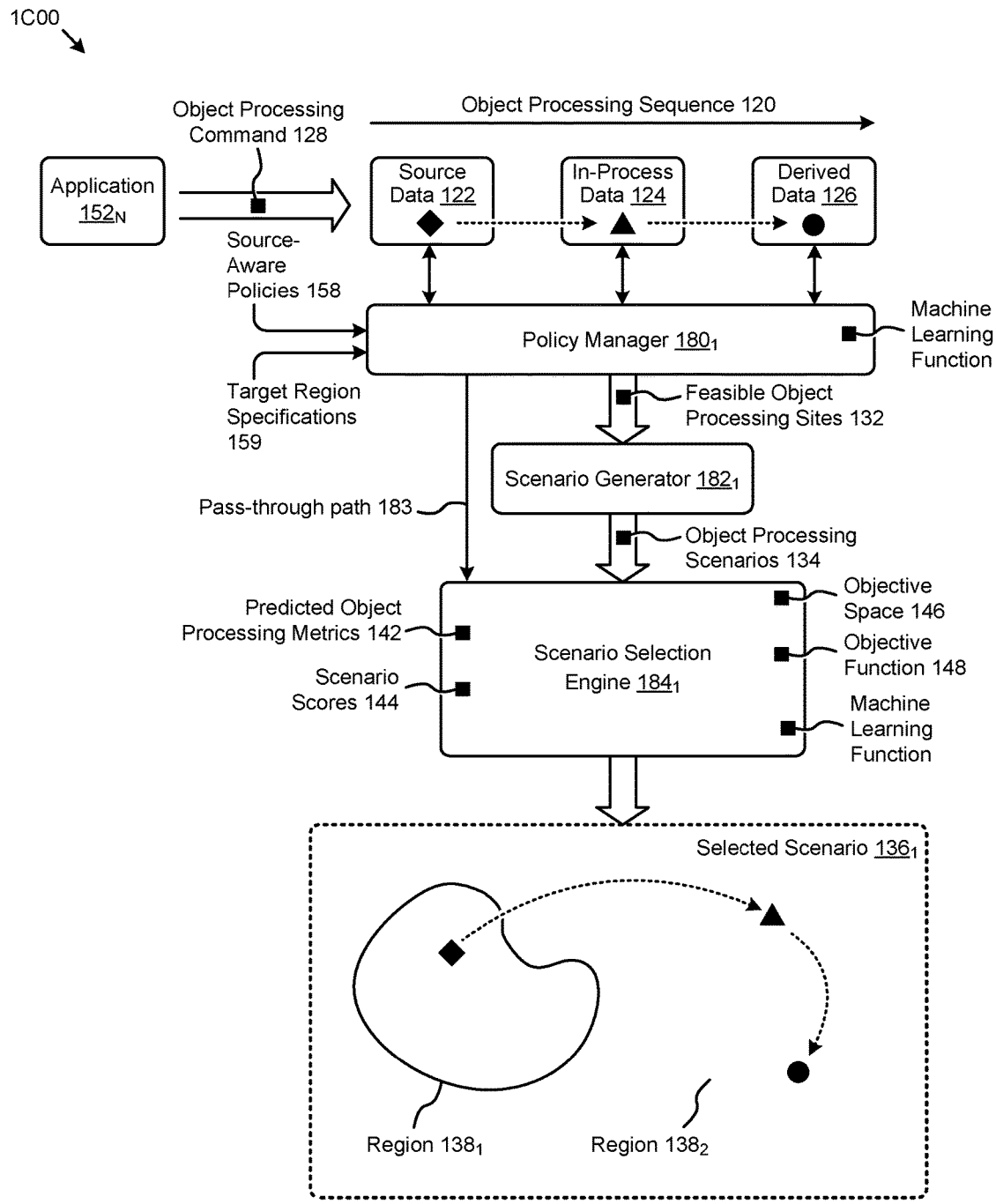
FIG. 1C presents a content object processing scenario selection technique implemented in systems for accessing cloud-based content management resources using source-aware storage policies, according to an embodiment.

Some embodiments of the present disclosure address the problem of using various cloud-based content management resources with resource-agnostic and source-aware commands and policies, and some embodiments are directed to approaches for dynamically determining operations to be performed at a selected collection of cloud-based content management resource sites using a policy management layer to apply storage policies based in part on source attributes. More particularly, disclosed herein and in the accompanying figures are exemplary environments, systems, methods, and computer program products for accessing cloud-based content management resources using source-aware storage policies.

Overview

The proliferation of cloud-based services and platforms continues to increase. One benefit of using a cloud-based storage service is efficient use of cloud-based content management resources (e.g., storage facilities, compute facilities, etc.) storing and/or processing digital content (e.g., "files"). Where and how content is accessed, processed and/or stored is specified in part by storage policies defined by various stakeholders in the cloud-based storage ecosystem (e.g., the client, the cloud-based storage service provider, the storage facility provider, etc.) based at least in part on various policy objectives (e.g., security, accessibility, loss protection, cost, performance, etc.). As the number of cloud-based content management resource options (e.g., locations, sites, etc.) and complexity of policy objectives increase, however, maintaining the desired storage policy flexibility can be difficult. Legacy approaches to providing such storage policy flexibility are limited in that they are based at least in part on resource-specific commands and policies, and do not consider then-current source attributes when applying the policies. Legacy approaches can also present limitations at least as pertaining to selecting from among the feasible content management resource facilities to carry out a given object processing scenario. For example, legacy approaches often fail to select a scenario from the set of feasible scenarios that has the highest probability of achieving certain objectives, such as minimizing cost and/or maximizing performance.

To address the need for using various cloud-based content management resources with resource-agnostic and source-aware commands and policies, the techniques described herein discuss (1) an approach and protocol for communication between a client application and a cloud-based storage system using a source-aware policy management layer, (2) source-aware policy application techniques and associated data structures for dynamically generating operations to be performed at multiple content storage facilities, and (3) policy rule and routing table specifications and use approaches. To address the need for performing content object processing using a set of cloud-based content management resources selected according to some objective, the techniques described herein further discuss (4) content object processing scenario generation and comparison techniques, (5) an objective analysis approach for selecting an object processing scenario based at least in part on various objectives, and (6) objective specifications and use approaches.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment, and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts a provider-oriented multi-path approach 1A00 for accessing multiple content storage facilities. As an option, one or more instances of multi-path approach or any aspect thereof may be implemented in the context of the architecture and functionality of the embodiments described herein. The multi-path approach or any aspect thereof may be implemented in any desired environment.

The shown provider-oriented multi-path approach 1A00 is a merely one approach for providing client applications (e.g., application $152_1$, application $152_2$, . . . , application $152_N$) access to certain cloud-based content management resources, such as content storage facilities in a cloud-based storage system. As shown, the content storage facilities $160_1$ comprise a high-availability storage facility 161 and a local network area storage facility 162 provided by "provider1", and a plurality of external storage facilities (e.g., external storage facility $163_1$, . . . , external storage facility $163_M$) provided by associated providers (e.g., provider2, . . . , providerM, respectively). The high-availability storage facility 161 can be a storage facility co-located with the cloud-based storage service, and the local network area storage facility 162 can be a storage facility included in a dedicated private cloud. Further, the plurality of external storage facilities can be third-party storage facilities (e.g., from Amazon, Google, HP, IBM, Rackspace, etc.). The applications can use the content storage facilities $160_1$ through certain associated facility-specific application programming interfaces (APIs) such as is depicted by the instances of provider1 API $154_1$, provider2 API $154_2$, . . . , providerM API $154_M$.

In this approach, each application is required to know a priori the target storage facility and construct, and issue a resource-specific (e.g., facility-specific) and/or provider-specific storage commands. The provider-specific APIs can only apply storage policies specific to the one or more storage facilities associated with the provider, and do not consider varying source attributes (e.g., client location, a service level agreement or "SLA", a tariff, a geographic indication, a sensitivity indication, a security objective, a retention attribute, an information life cycle attribute, a priority indication, etc.) when applying the policies. Such facility-specific policies that do not consider certain source attributes can be described as source-oblivious policies 156. The provider-specific APIs and source-oblivious policies 156 in the provider-oriented multi-path approach 1A00 limit the ability of the client applications to efficiently use the available content management resource options (e.g., content storage facilities $160_1$) while meeting or exceeding changing policy objectives. Such limitations are addressed by the herein disclosed techniques as shown and described in the approach depicted in FIG. 1B.

FIG. 1B depicts a resource-agnostic approach 1B00 for accessing cloud-based content management resources using source-aware storage policies. As an option, one or more instances of resource-agnostic approach 1B00 or any aspect thereof may be implemented in the context of the architecture and functionality of the embodiments described herein. The resource-agnostic approach 1B00 or any aspect thereof may be implemented in any desired environment.

The embodiment shown in FIG. 1B comprises the content storage facilities $160_1$, the client applications (e.g., application $152_1$, application $152_2$, . . . , application $152_N$), and the provider APIs (e.g., provider1 API $154_1$, provider2 API $154_2$, . . . , providerM API $154_M$) shown and described as pertains to FIG. 1A. The resource-agnostic approach 1B00 further includes a layer comprising a policy manager $180_1$ between the client applications and provider APIs. In this approach, the policy manager $180_1$ receives resource-agnostic commands from the client applications, generates source attributes from the commands and associated content (e.g., objects), and uses the source attributes to dynamically apply storage policies and determine operations to be performed on the cloud-based content management resources, such as content storage facilities $160_1$. Since the source attributes are used to determine, at least in part, the storage policies to apply, such policies can be described as source-aware policies 158 (as shown). Furthermore, and as shown and described herein, the policy manager can accept and operate using target region specifications 159.

In the herein disclosed approach shown in FIG. 1B, the problem of using various cloud-based content management resources with resource-agnostic and source-aware commands and policies is addressed. Specifically, the client applications can construct and issue commands that need only conform to a structure that can be interpreted by the policy manager $180_1$, and that can be agnostic to the specific provider and/or content management resource (e.g., storage facility). This characteristic facilitates changes to the content storage facilities $160_1$ with no changes to the applications. The policy manager $180_1$ can further apply storage policies according to rules, policies, or specifications (e.g., source-aware policies 158 or target region specifications 159) that can be based at least in part on certain source attributes and/or certain target region attributes. This characteristic enables an increased flexibility in applying policies across the content storage facilities $160_1$ and/or other content management resources so as to meet changing policy objectives.

In some cases, a collection of content management resources (e.g., compute and storage) are used to perform a sequence of operations on a given content object. The herein disclosed techniques can be used to facilitate selection of such resources as shown and described in FIG. 1C.

FIG. 1C presents a content object processing scenario selection technique 1C00 implemented in systems for accessing cloud-based content management resources using source-aware storage policies. As an option, one or more instances of content object processing scenario selection technique 1C00 or any aspect thereof may be implemented in the context of the architecture and functionality of the embodiments described herein. The content object processing scenario selection technique 1C00 or any aspect thereof may be implemented in any desired environment.

As shown in FIG. 1C, application $152_N$ earlier described in FIG. 1B might invoke an object processing command 128 that produces an object processing sequence 120 for a given source object. For example, a certain document might be searched according to some search terms to return a set of search results. Other processing in content management systems might also pertain to, preview (e.g., thumbnail, PDF, etc.) generation, virus scanning, watermarking, copyright management and tracking, encryption, and/or other operations. The object processing sequence 120 can access any form of data corresponding to the source object (e.g., searched document) and pertaining to the object itself and/or an object processing sequence. As shown, in reference to the foregoing search example, the object processing sequence 120 might access instances of, and/or metadata pertaining to, source data 122. Data sets in the form of source data and/or its metadata can include the document to be searched, in-process data 124, any variations of the parsed contents of the document, and/or derived data 126 (e.g., search results). The foregoing data sets can have varying characteristics that might invoke respective policies, possibly including site-specific security policy statements. For example, source data 122 might be encrypted and stored in persistent storage, while in-process data 124 might be unencrypted but in held in local memory for a short period of time. Derived data 126 (e.g., search results) might also be unencrypted but stored for a long period of time. In some cases, the nature of derived data can be determined using automated classification techniques. Derived data can include, without limitation, indexes, previews, thumbnails, virus scan reports, watermarked documents, stream representations, etc.

In such cases, source-aware policies 158 and/or target region specifications 159 pertaining to the various data states in the object processing sequence 120 can be applied by policy manager $180_1$ to determine a set of feasible object processing sites 132 according to the herein disclosed techniques. As an example, such processing sites can be located in various regions (e.g., region $138_1$, region $138_2$, etc.) defined by physical (e.g., geographic, hardware, etc.), logical (e.g., compliance, enterprise, etc.), and/or other boundaries. An instance of a scenario generator $182_1$ can generate various instances of object processing scenarios 134 that use different combinations of feasible object processing sites 132. A scenario selection engine $184_1$ can choose a selected scenario $136_1$ from among the object processing scenarios 134 using various techniques. According to certain embodiments, for example, multi-objective analysis techniques can be implemented at scenario selection engine $184_1$ to select a scenario that maximizes or minimizes certain objectives. In some situations, the scenario generator can be bypassed using the pass-through path 183. More particularly, if a set of scenarios had been earlier generated based on the same or similar inputs, then logic might deem that the pass-through path can be taken and a possibly redundant scenario set is not regenerated. In some cases, fuzzy logic or other machine learning techniques can be used to make a determination as to whether or not the scenario generator can be bypassed using the pass-through path 183. As shown, a machine learning function can be implemented within the policy manager.

A set of predicted object processing metrics 142 corresponding to the feasible object processing sites 132 can be used to plot the object processing scenarios 134 in an objective space 146. For example, a cost metric and a latency metric might be associated with each feasible site such that an overall cost and latency for each scenario can be calculated. In this case, object processing scenarios 134 can be plotted in an instance of objective space 146 having a cost dimension and a latency dimension. Any number of other objectives (e.g., object vectors) comprising the objective space are possible, any of which can be codified and quantitatively interrelated using a quantifiable objective function (e.g., a mathematical objective function). An objective function 148 relating the objectives (e.g., cost and latency) in objective space 146 can be used to determine scenario scores 144 for the object processing scenarios 134. For example, the highest (or lowest) scenario score might correspond to an optimum or one of the optima from the set of object processing scenarios 134 in the objective space 146. Specifically, accessing the source data 122 in region $138_1$ while processing the in-process data 124 and storing the derived data 126 in region $138_2$, according to selected scenario $136_1$, might result in a minimal cost and minimal latency.

The partitioning of the shown policy manager $180_1$ is merely one possible partitioning. Other partition choices are possible, for example partition where the scenario generator and/or the scenario selection engine are subsumed within the policy manager. In one possible partition choice, the machine learning function that is implemented within the policy manager can predict a quality or other metric of a scenario based on a history of stimulus (e.g., storage and processing commands) and responses (e.g., determination of a selected scenario). In still other partitioning choices, a machine learning function is subsumed within the scenario selection engine. In this and other partitioning, the machine learning function can be used in site selection based on a history of stimulus and responses. The results of the machine learning function can be used with or without other quantitative evaluation of scenarios so as to generate scenarios and/or to enumerate or select sites included in the scenarios. In some situations, it is possible to predict if a new feasible scenario can be generated at all, and/or if any such generated scenario can be predicted to have an outcome that is either better than ones previously generated, and/or to determine if a predicted scenario is likely to have an outcome that is better than (or worse than) some previously-determined norm (e.g., based on a history of observed patterns).

Figure 2A:
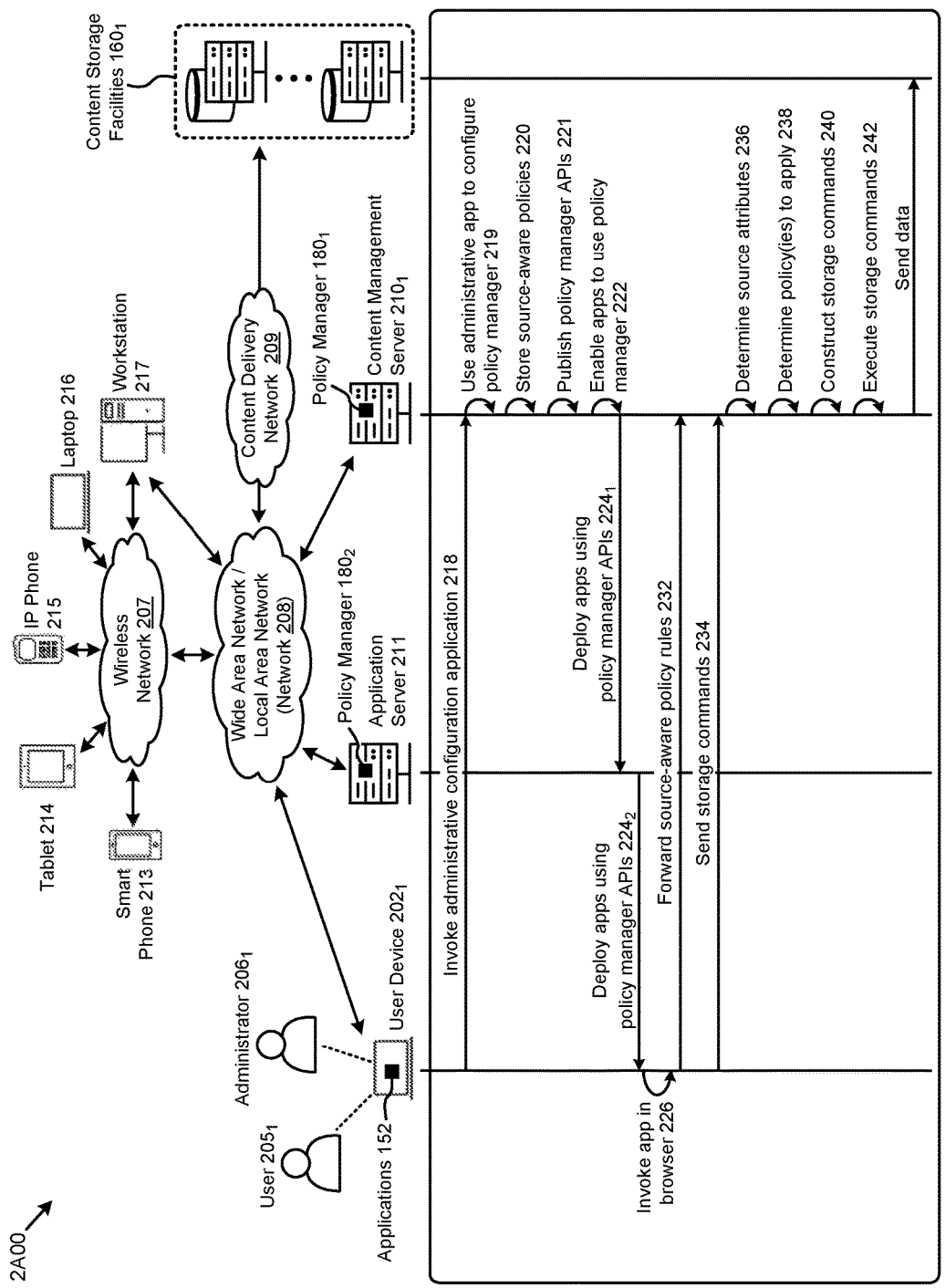
FIG. 2A depicts a protocol implemented by system components for accessing cloud-based content management resources using source-aware storage policies, according to some embodiments.
Figure 2B:
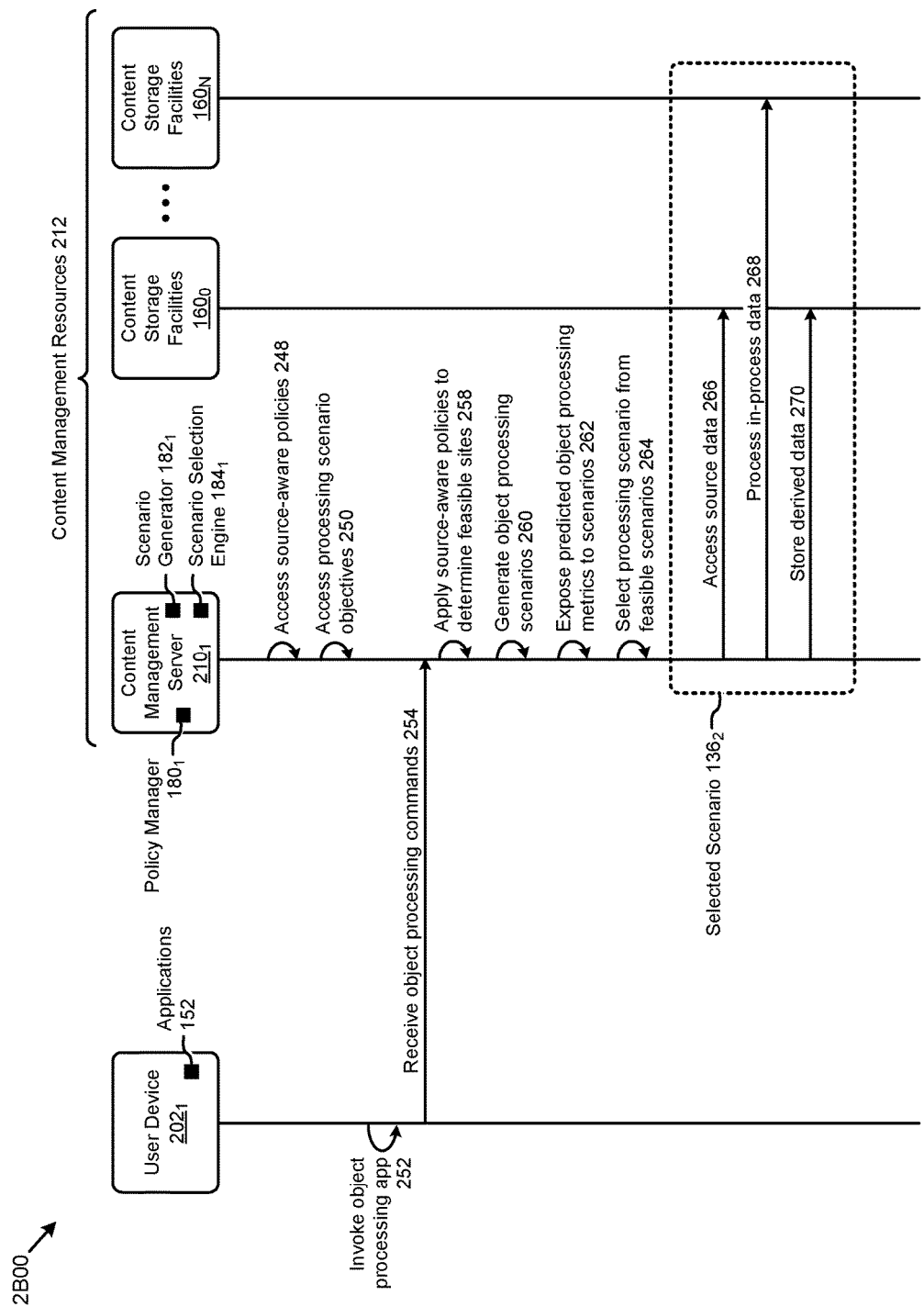
FIG. 2B depicts an interaction diagram showing system component interactions that facilitate selecting cloud-based content management resources for content object processing, according to some embodiments.

Environments and protocols for implementing the resource-agnostic approach 1B00 and the content object processing scenario selection technique 1C00 is shown and described as pertains to FIG. 2A and FIG. 2B, respectively.

FIG. 2A depicts a protocol 2A00 implemented by system components for accessing cloud-based content management resources using source-aware storage policies. As an option, one or more instances of protocol 2A00 or any aspect thereof may be implemented in the context of the architecture and functionality of the embodiments described herein. The protocol 2A00 or any aspect thereof may be implemented in any desired environment.

As shown in FIG. 2A, protocol 2A00 depicts a set of high-level interactions (e.g., operations, messages, etc.) among various computing systems (e.g., servers and devices) interconnected by a wireless network 207, a network 208, and a content delivery network 209. The wireless network 207, the network 208, and the content delivery network 209 can comprise any combination of a wide area network (e.g., WAN), local area network (e.g., LAN), cellular network, wireless LAN (e.g., WLAN), or any such techniques for facilitating communication of computing systems. The wireless network 207, the network 208, and the content delivery network 209 can be referred to collectively as the Internet. The content delivery network 209 can comprise any combination of a public network and a private network.

The computing systems shown in protocol 2A00 comprise at least one instance of a content management server $210_1$, at least one instance of an application server 211, and at least one instance of the content storage facilities $160_1$. The servers and storage facilities shown in protocol 2A00 can represent any single computing system with dedicated hardware and software, multiple computing systems clustered together (e.g., a server farm), a portion of shared resources on one or more computing systems (e.g., virtual server), or any combination thereof.

For example, the content management server $210_1$ and the content storage facilities $160_1$ can comprise a cloud-based storage system that provides content management services. In one or more embodiments, and as shown, the earlier described policy manager can be executed at the content management server (e.g., at policy manager $180_1$) and/or at an application server (e.g., at policy manager $180_2$). The computing systems shown in protocol 2A00 further comprise an instance of a user device $202_1$ that can represent one of a variety of other computing devices (e.g., a smart phone 213, a tablet 214, an IP phone 215, a laptop 216, a workstation 217, etc.) having hardware and software (e.g., applications 152) capable of processing and displaying information (e.g., web page, graphical user interface, etc.) and communicating information (e.g., web page request, user activity, content objects, etc.) over the wireless network 207, the network 208, and the content delivery network 209. As shown, various instances of the user device $202_1$ can be operated by an administrative user (e.g., administrator $206_1$) or other sort of a user $205_1$.

More particularly, administrator $206_1$ can invoke an administrative configuration application (message 218) to configure the policy manager $180_1$ (operation 219) to access certain source-aware policies (as well as other policies), which policies can be stored at the content management server and/or other locations (operation 220). A set of policy manager APIs can be published so as to be used by applications (operation 221). As shown, such applications can be enabled to use the policy manager $180_1$ (operation 222), which applications and associated policy manager APIs can further be provided to application server 211 (message $224_1$) and/or provided to user device $202_1$ (message $224_2$) to serve to users invoking the applications. In this embodiment, user-initiated operations using source-aware policies commence as discussed infra. The user device $202_1$, the application server 211, the content management server $210_1$, and the content storage facilities $160_1$ can interact as shown, and the aforementioned computing resources can individually or cooperatively access one or more content management resources (e.g., content storage facilities $160_1$) using source-aware storage policies.

For example, user $205_1$ can invoke one or more instances of applications 152 at user device $202_1$ (operation 226), and application server 211 can respond by serving the requested application view for rendering on a browser operating on the user device $202_1$. The application can be used to specify various source-aware policy rules and/or invoke object processing operations that trigger the application of such source-aware policy rules, and such specification can be inherent (e.g., derived from a source object type or from other source object attributes) or explicit (e.g., by specification of a particular source-aware policy or policies). For example, the user $205_1$ or another authorized user (e.g., storage policy administrator) can specify that policy "policyABC" can be applied when certain source attributes satisfy certain conditions. Such source-aware policy rules can be forwarded to the content management server $210_1$ for use by the policy manager $180_1$ (message 232). In another situation, and again, strictly as an example, the user $205_1$ or another authorized user (e.g., storage policy administrator) can specify that policy "policyXYZ" is to be applied to an uploaded item when the uploaded items is of "source type"="document", or "sensitivity"="secret".

When content storage commands are issued by the user $205_1$ from user device $202_1$ (message 234), the policy manager $180_1$ at the content management server $210_1$ can use the commands and associated content (e.g., an object or objects) to generate source attributes (operation 236). Using the source attributes and the source-aware policy rules, the policy manager $180_1$ can determine the policy or policies to apply (operation 238). Based at least in part on the identified policy or policies, associated storage commands can be constructed (operation 240) and executed on target storage locations in the content storage facilities $160_1$ specified in the policies (operation 242). Further operations and messages in protocol 2A00 can depend on the specific content storage commands issued by the user $205_1$. In some cases, one or more content streams can transfer from the user device $202_1$ to the content storage facilities $160_1$ (e.g., via an upload path). In other cases, one or more content streams can be transferred from the content storage facilities $160_1$ to the user device $202_1$ (e.g., via a download path). A computing environment for implementing the protocol 2A00 is shown and described as pertains to FIG. 2D.

In some cases, applying the source-aware policies can result in several feasible content management resource sites that can be used to process the commands from user device $202_1$. Such commands might pertain to compute and/or storage operations. In these cases, a set of resources from the feasible resources can be selected to carry out the operations based at least in part on one or more objectives. One embodiment of system component interactions that facilitate such content management resource selection according to the herein disclosed techniques is shown and described as pertaining to FIG. 2B.

FIG. 2B depicts an interaction diagram 2B00 showing system component interactions that facilitate selecting cloud-based content management resources for content object processing. As an option, one or more instances of interaction diagram 2B00 or any aspect thereof may be implemented in the context of the architecture and functionality of the embodiments described herein. The interaction diagram 2B00 or any aspect thereof may be implemented in any desired environment.

FIG. 2B depicts user device $202_1$, content management server $210_1$, and the content storage facilities $160_0$ earlier described pertaining to FIG. 2A. FIG. 2B further depicts another instance of content storage facilities $160_N$ that, in conjunction with content management server $210_1$ and the content storage facilities $160_1$, can represent a set of content management resources 212 that might be availed to user device $202_1$ to facilitate processing (e.g., compute, storage, etc.) of certain content (e.g., objects, files, documents, etc.). For example, any one of the applications 152 operating at user device $202_1$ might invoke content object processing operations that use the content management resources 212. In some cases, the user and/or content management service provider might want to perform the content object processing using a set of content management resources selected according to certain source-aware policies and/or objectives, such as objectives related to cost and/or performance.

According to the herein disclosed techniques as depicted in the interaction diagram 2B00, the aforementioned selection of the content management resources can be facilitated by accessing certain source-aware policies at content management server $210_1$ (operation 248). Such policies, for example, can be specified at least in part by an administrative user to configure the policy manager $180_1$ at content management server $210_1$ as earlier described. A set of processing scenario objectives can further be accessed at the content management server $210_1$ (operation 250). In some cases, the administrative user can further specify the objectives pertaining to object processing, such as minimize cost, minimize latency, maximize availability, maximize security, and/or other objectives. In many cases, the content management service provider might determine the processing objectives based at least in part on certain established criteria. For example, a service level agreement established with an enterprise might precipitate a set of objectives (e.g., pertaining to cost, availability, etc.) for the service provider.

When certain object processing apps (e.g., document editing app) are invoked at user devices $202_1$ (operation 252) and object processing commands from the apps are received (message 254), the source-aware policies can be applied to the object and/or command attributes to determine the feasible object processing sites from the content management resources 212 (operation 258). For example, policy manager $180_1$ can apply the source-aware policies using the techniques disclosed herein to determine the feasible object processing sites for executing the received commands. As an example, such processing sites can be located in various regions defined by physical (e.g., geographic, hardware, etc.), logical (e.g., compliance, enterprise, etc.), and/or other boundaries.

As shown in FIG. 2B, the various sites are represented by a set of content storage facilities. An instance of scenario generator $182_1$ at content management server $210_1$ can generate object processing scenarios that use different combinations of the feasible object processing sites (operation 260). A set of predicted object processing metrics corresponding to the feasible object processing sites can be exposed to the object processing scenarios to facilitate comparison of the scenarios in an objective space (operation 262). For example, a cost and latency metric can be determined for each scenario so as to facilitate comparison of the scenarios in an objective space having a cost dimension and a latency dimension. Any number of other objectives (e.g., object vectors) comprising the objective space are possible.

An instance of scenario selection engine $184_1$ at content management server $210_1$ can select the object processing scenario from the feasible scenarios that can be used to execute the received command or commands (operation 264). For example, an objective function relating the objectives (e.g., cost and latency) in the objective space can be used to determine scenario scores, certain of which scores might correspond to an optimum or one of the optima from the set of object processing scenarios in the objective space. As shown, for example, the selected scenario $136_2$ might access the source data for the object processing command from the content storage facilities $160_0$ (message 266), process the object such that in-process data is stored in the content storage facilities $160_N$ (message 268), and store data derived from the processing in content storage facilities $160_0$ (message 270).

Figure 2C:
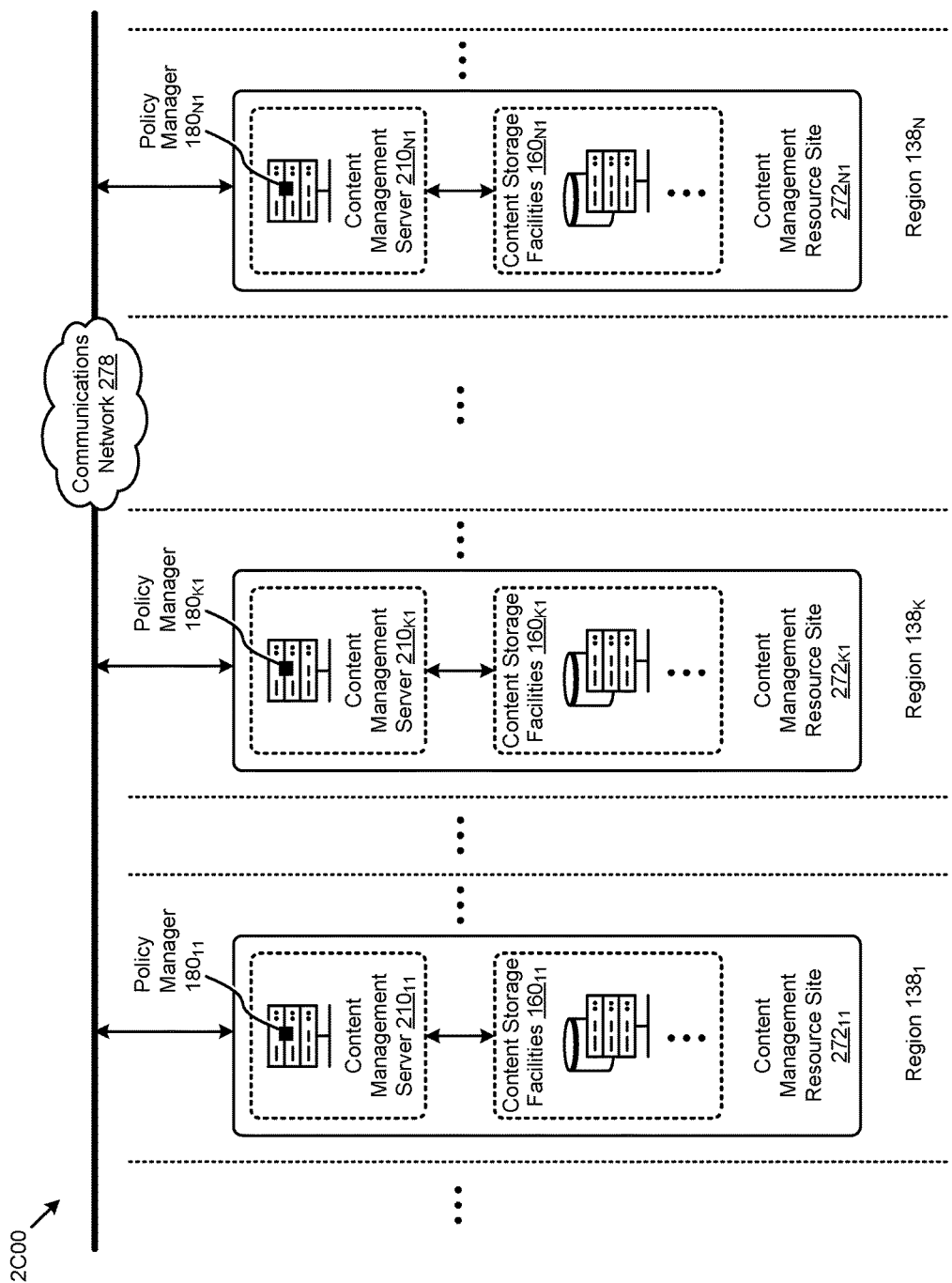
FIG. 2C is a schematic of a computing environment for implementing systems that access cloud-based content management resources using source-aware storage policies, according to an embodiment.

A computing environment for implementing the protocol 2A00 and/or the system component interactions in interaction diagram 2B00 is shown and described as pertains to FIG. 2C.

FIG. 2C is a schematic of a computing environment 2C00 for implementing systems that access cloud-based content management resources using source-aware storage policies. As an option, one or more instances of computing environment 2C00 or any aspect thereof may be implemented in the context of the architecture and functionality of the embodiments described herein. The computing environment 2C00 or any aspect thereof may be implemented in any desired environment.

As shown in FIG. 2C, the computing environment 2C00 comprises a plurality of content management resource sites represented by content management resource site $272_{11}$, content management resource site $272_{K1}$, . . . , content management resource site $272_{N1}$. In the embodiment shown, each content management resource site comprises a respective instance of a content management server (e.g., content management server $210_{11}$, content management server $210_{K1}$, . . . , content management server $210_{N1}$) and a respective collection of content storage facilities (e.g., content storage facilities $160_{11}$, content storage facilities $160_{K1}$, . . . , content storage facilities $160_{N1}$). In various cases, each content management resource site can have zero or more storage facilities of various types (e.g., NAS, SAN, etc.) and can have the ability to store metadata. As shown, an instance of a policy manager (e.g., policy manager $180_{11}$, policy manager $180_{K1}$, . . . , policy manager $180_{N1}$) can be operated by the respective content management server at each content management resource site. In some embodiments, the content management servers might operate respective instances of the scenario generator and/or the scenario selection engine earlier described. The aforementioned computing resources can communicate through a communications network 278 comprising various combinations of wireless networks, content delivery networks, the Internet, intranets, private networks, and/or other networks.

In the embodiment and example shown, the content management resource sites are associated with various regions (e.g., region $138_1$, region $138_K$, . . . , region $138_N$). As illustrated, more than one content management resource site can be associated with a region. Further, such regions can be defined by physical (e.g., geographic, hardware, etc.), logical (e.g., compliance, enterprise, etc.), and/or other boundaries. For example, the regions can be regions within countries (e.g., US-1, US-2, EUR-1, EUR-2, etc.), or can be any geographic indication such as a province or state or city, etc. As another example, the regions can be associated with time zones.

The regions can also have boundaries associated with security policies instituted at various levels, such as a federal government level, a state government level, or other jurisdiction level (e.g., prohibiting cross-border transfer of encrypted data), an industry level, an enterprise level, and/or other levels. Techniques are disclosed herein such that a resource site is tasked with processing that does not or would not violate a respective level-specific security policy. Strictly as one example, if a resource site is located in a jurisdiction that prohibits cross-border transfer of encrypted data, then that resource site would not be assigned an encryption task or tasks that would violate a respective level-specific security policy. In some cases a new resource site can be added to a list of available resource sites within a jurisdiction so as to ensure that there are sufficient in-jurisdiction resources so as to accomplish specific tasks such as encryption or decryption.

Computing environment 2C00 can have, for example, meta sites and content sites in respective regions and/or within regions. The meta sites can be responsible for supporting client applications and associated metadata, and the content sites can manage content. The content management resource sites can have access to the metadata and content storage facilities at other content sites (e.g., through communications network 278). The content management resource sites can also access the metadata stored at a meta site. For example, such access enables support for disaster recovery and temporary outages. Further, the content management resource sites can be associated in protection groups or pools. Such pools increase availability and reliability by replicating metadata and content. The pools and their attributes (e.g., priority, retention, etc.) can be specified in associated policies. For example, content sites US-1 and US-2 can comprise a pool such that the US-1 metadata is replicated to US-2, and the US-2 metadata is replicated to US-1. Pools can further enable continued operation in the presence of a failed content site and/or meta site. For example, when a content site has failed during a content upload operation, the content site in the pool with the next highest priority will be used to perform the upload, and a replication operation is queued for the failed content site when it is back online. As another example, when a meta site has failed during content upload, another content site (e.g., in the pool) can be selected to service the request as a proxy, and the metadata written to the failed meta site is queued for the failed content site to be processed when it is back online.

Other types of regions and partitioning of content management resources are possible. One example of such partitioning is shown and described as pertaining to FIG. 2D.

Figure 2D:
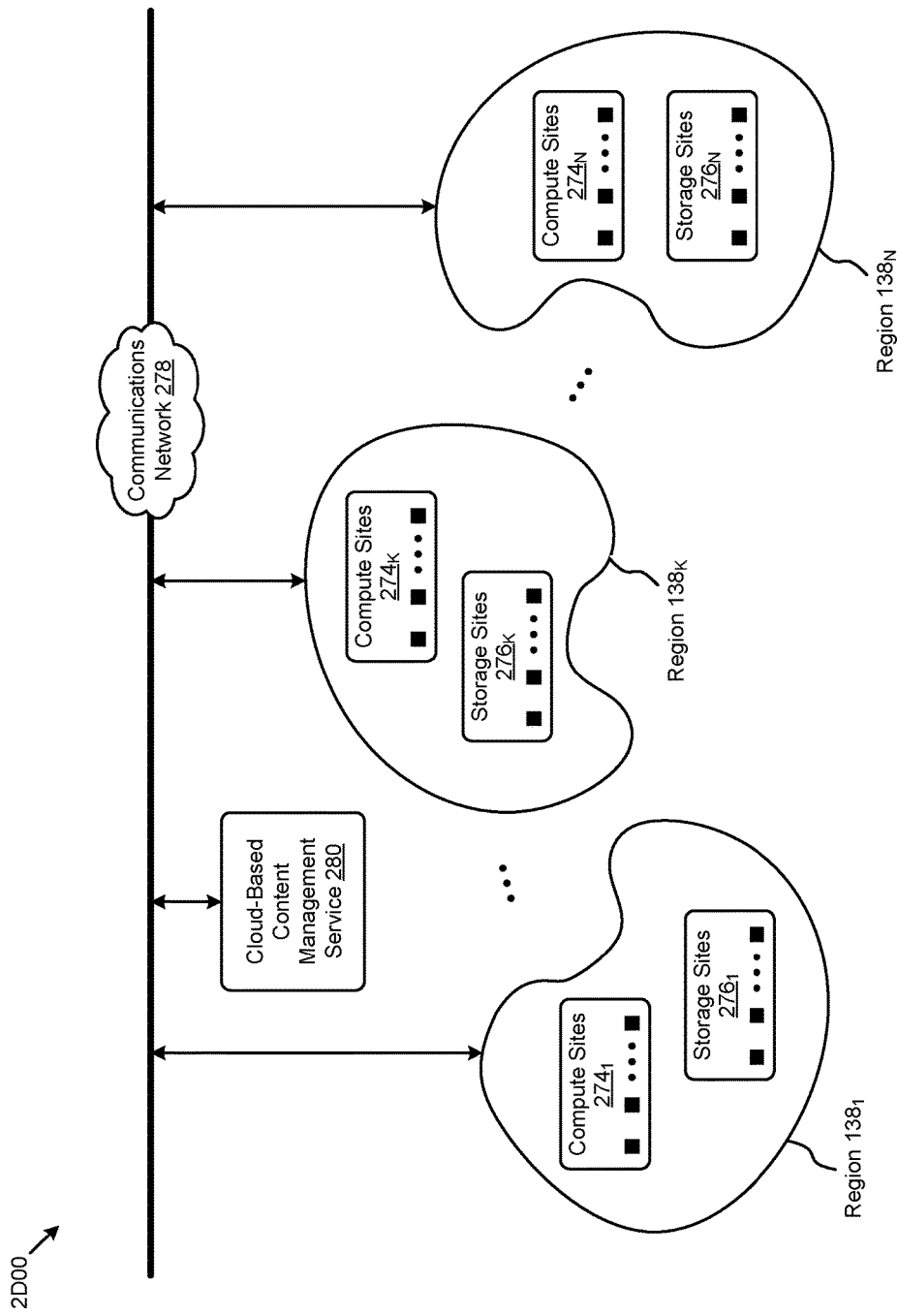
FIG. 2D presents a view of a cloud-based content management resource environment for implementing systems that access cloud-based content management resources using source-aware storage policies, according to an embodiment.

FIG. 2D presents a view of a cloud-based content management resource environment 2D00 for implementing systems that access cloud-based content management resources using source-aware storage policies. As an option, one or more instances of cloud-based content management resource environment 2D00 or any aspect thereof may be implemented in the context of the architecture and functionality of the embodiments described herein.

As shown, cloud-based content management resource environment 2D00 comprises a representative set of content management resource regions (e.g., region $138_1$, region $138_K$, . . . , region $138_N$) having boundaries characterized by certain attributes. For example, such attributes might be related to geography, legal jurisdictions, corporate firewalls, and/or other attributes. A cloud-based content management service 280 might access (e.g., through communications network 278) certain compute sites and/or storage sites in the regions to carry out content object processing operations. Specifically, as shown, the cloud-based content management service 280 might access a set of compute sites $274_1$ and/or a set of storage sites $276_1$ in region $138_1$, a set of compute sites $274_K$ and/or a set of storage sites $276_K$ in region $138_K$, and/or a set of compute sites $274_N$ and/or a set of storage sites $276_N$ in region $138_N$. A set of metrics corresponding to the compute sites can be evaluated to determine their positions in an objective space. For example, a cost metric and a latency metric might be associated with each feasible compute site such that an overall cost and latency pertaining to use of the compute site can be evaluated. Similarly, a set of metrics corresponding to the storage sites can be evaluated to determine their positions in an objective space. For example, a cost metric and a latency metric might be associated with each feasible storage site such that an overall cost and latency pertaining to use of the storage site can be evaluated.

In some cases, source-aware policies applied to certain object processing commands can limit the sites availed to the cloud-based content management service 280. For example, certain policies might restrict processing and storage of certain objects to region $138_1$, while other policies might have different compliance characteristics. As another example, compliance with source-aware policies pertaining to a document search request might be facilitated by accessing the document at a storage site in region $138_K$, processing the search at a compute site in region $138_N$, and storing the search results at a storage site in region $138_1$. In some cases, multiple processing scenarios using different combinations of compliant sites are possible. In such cases, the scenarios can be analyzed to select a scenario based at least in part on certain objectives according to the herein disclosed techniques.

Figure 3:
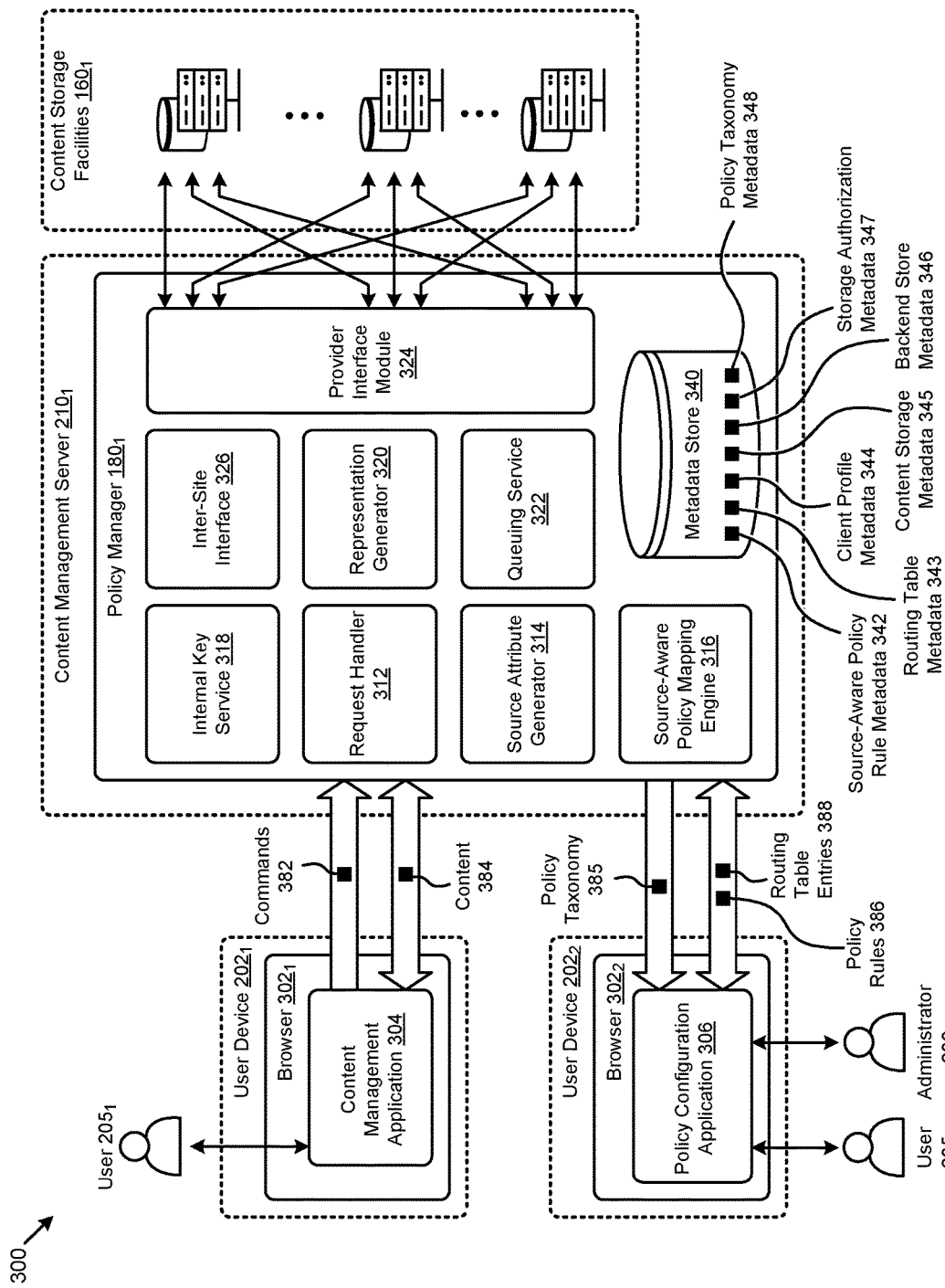
FIG. 3 is a block diagram of a system for implementing accessing cloud-based content management resources using source-aware storage policies, according to an embodiment.

FIG. 3 is a block diagram of a system 300 for implementing accessing cloud-based content management resources using source-aware storage policies. As an option, one or more instances of system 300 or any aspect thereof may be implemented in the context of the architecture and functionality of the embodiments described herein. The system 300 or any aspect thereof may be implemented in any desired environment.

The system 300 illustrates an embodiment of the herein disclosed techniques for accessing cloud-based content management resources using source-aware storage policies. As shown, system 300 comprises one or more instances of the components described in FIG. 2A with more details to further describe the herein disclosed techniques and approach. Other components and/or operation partitioning are possible.

Specifically, the content management server $210_1$ is shown communicating with the content storage facilities $160_1$, the user device $202_1$, and a second instance of a user device $202_2$. The policy manager $180_1$ operating at the content management server $210_1$ is shown to further comprise a request handler 312, a source attribute generator 314, a source-aware policy mapping engine 316, an internal key service 318, a representation generator 320, a queuing service 322, a provider interface module 324, an inter-site interface 326, and a metadata store 340. A content management application 304 is also shown operating on a browser $302_1$ by user $205_1$ at user device $202_1$. Further, a policy configuration application 306 is shown operating on a browser $302_2$ by a user $205_2$ and/or administrator $206_1$ at user device $202_2$.

Various data flows, data structures, and data messages among the components in the system 300 are also shown. More specifically, the policy configuration application 306 can receive data describing a policy taxonomy 385 which can be used by policy configuration application 306 to enable an administrator $206_1$ to specify instances of policy rules 386 and routing table entries 388. For example, the policy taxonomy 385 can be selected from the policy taxonomy metadata 348 in the metadata store 340, and can be used to populate certain dropdown selection elements in the policy configuration application 306 graphical user interface (GUI). The policy rules 386 and routing table entries 388 can further be received by the policy manager $180_1$ and included in the source-aware policy rule metadata 342 and the routing table metadata 343, respectively, in the metadata store 340. The user $205_1$ can further issue instances of commands 382 to the policy manager $180_1$ using the content management application 304. The content management application 304 can also send and receive content (e.g., objects) to and from the policy manager $180_1$.

The commands 382 and content 384 are received by the policy manager $180_1$ by the request handler 312 and forwarded as required by the specific commands received. For example, the commands 382 and associated content can be forwarded to the source attribute generator 314 to generate various source attributes that can be used by the source-aware policy mapping engine 316 to determine one or more policies to apply in constructing storage commands to be executed by the provider interface module 324 in the content storage facilities. In some cases, the commands 382 will further invoke operations at the representation generator 320 and/or the queuing service 322.

For example, image objects might require various representations (e.g., thumbnails, previews, tiles, etc.) to be generated by the representation generator 320 and stored with the original image object. Also, for example, a certain applied policy might require replications of the original object to be stored (e.g., for reasons of availability, reliability, performance, etc.). In this case, the replications can be scheduled for asynchronous storage by the queuing service 322. The inter-site interface 326 can further be used to facilitate communications among associated content sites for sharing metadata, content, and other operations. In addition to the aforementioned metadata stored in the metadata store 340, the policy manager $180_1$ further has access to client profile metadata 344, content storage metadata 345, backend store metadata 346, and storage authorization metadata 347 for various purposes. Further details pertaining to the metadata and related data structures and components are disclosed in FIG. 4B and FIG. 4C and the associated discussion.

Figure 4A:
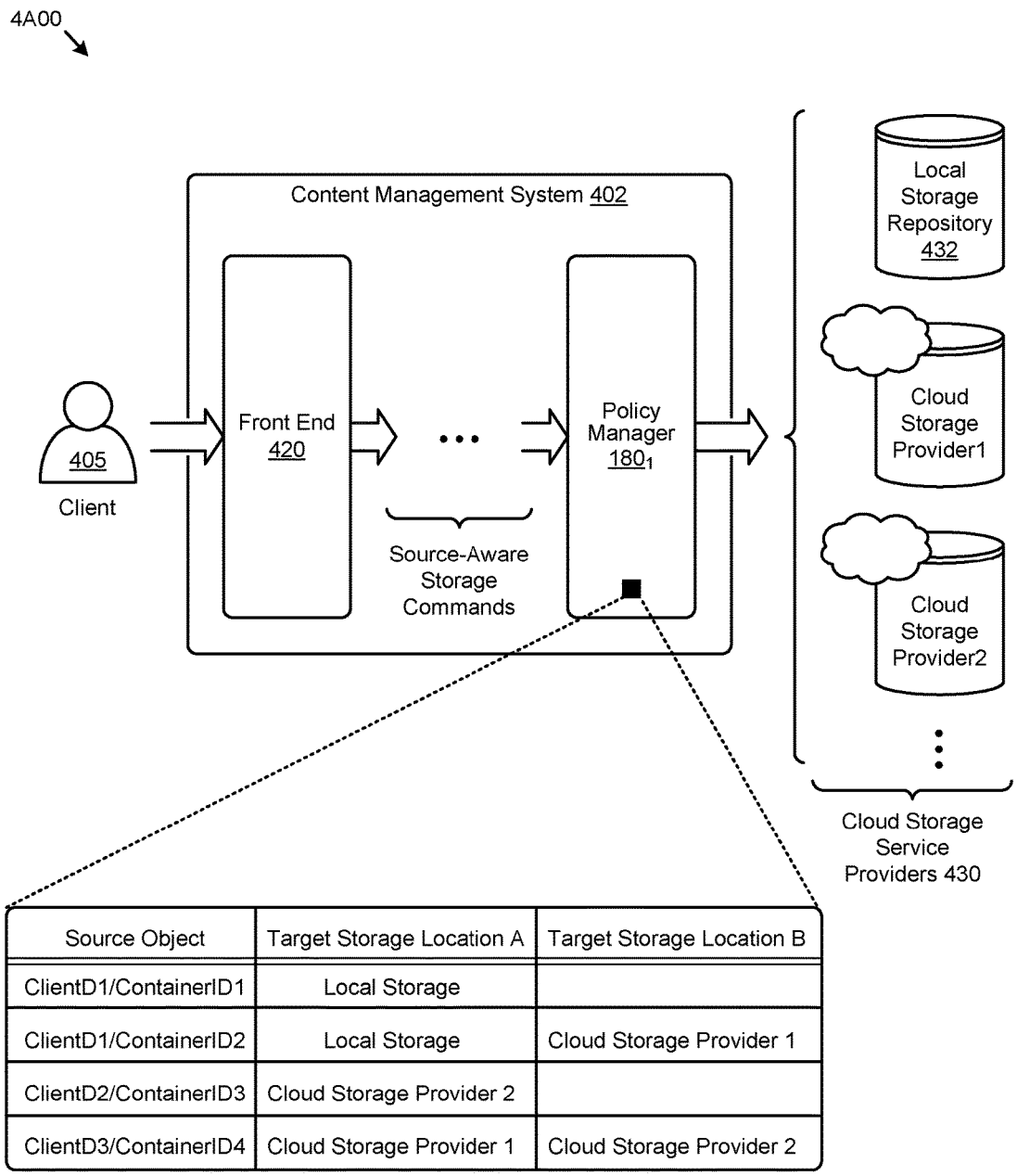
FIG. 4A illustrates a schematic of a system for accessing cloud-based content management resources using source-aware storage policies, according to some embodiments.

FIG. 4A illustrates a schematic of a system 4A00 for accessing cloud-based content management resources using source-aware storage policies. As an option, one or more instances of system 4A00 or any aspect thereof may be implemented in the context of the architecture and functionality of the embodiments described herein. The system 4A00 or any aspect thereof may be implemented in any desired environment.

As shown, a client 405 (e.g., a user or an administrator or a bot) can access a content management system 402. Any of the constituent components of the content management system can be situated in any geography or region, and any one or more content management servers can implement a front end 420. Strictly as one exemplary embodiment, a front end 420 can be composed of graphical user interfaces and/or applications that rely on one or more instances of a policy manager $180_1$ to access one or more instances of cloud storage service providers 430 (e.g., cloud storage provider1, cloud storage provider1, etc.) and/or one or more instances of local storage repository 432. The front end 420 can communicate (e.g., over the Internet) to one or more instances of a policy manager $180_1$, and such communication can include a source object and/or a source object identifier that is destined to be stored at one or more target storage locations in accordance with one or more source-aware policies. The content management system 402 can span multiple geographies.

In some situations, a front end can be partitioned so as to produce dynamically-generated source-aware storage commands that are delivered to the policy manager. One possible partitioning and source-aware policy usage techniques thereto are shown and described as pertains to FIG. 4B.

Figure 4B:
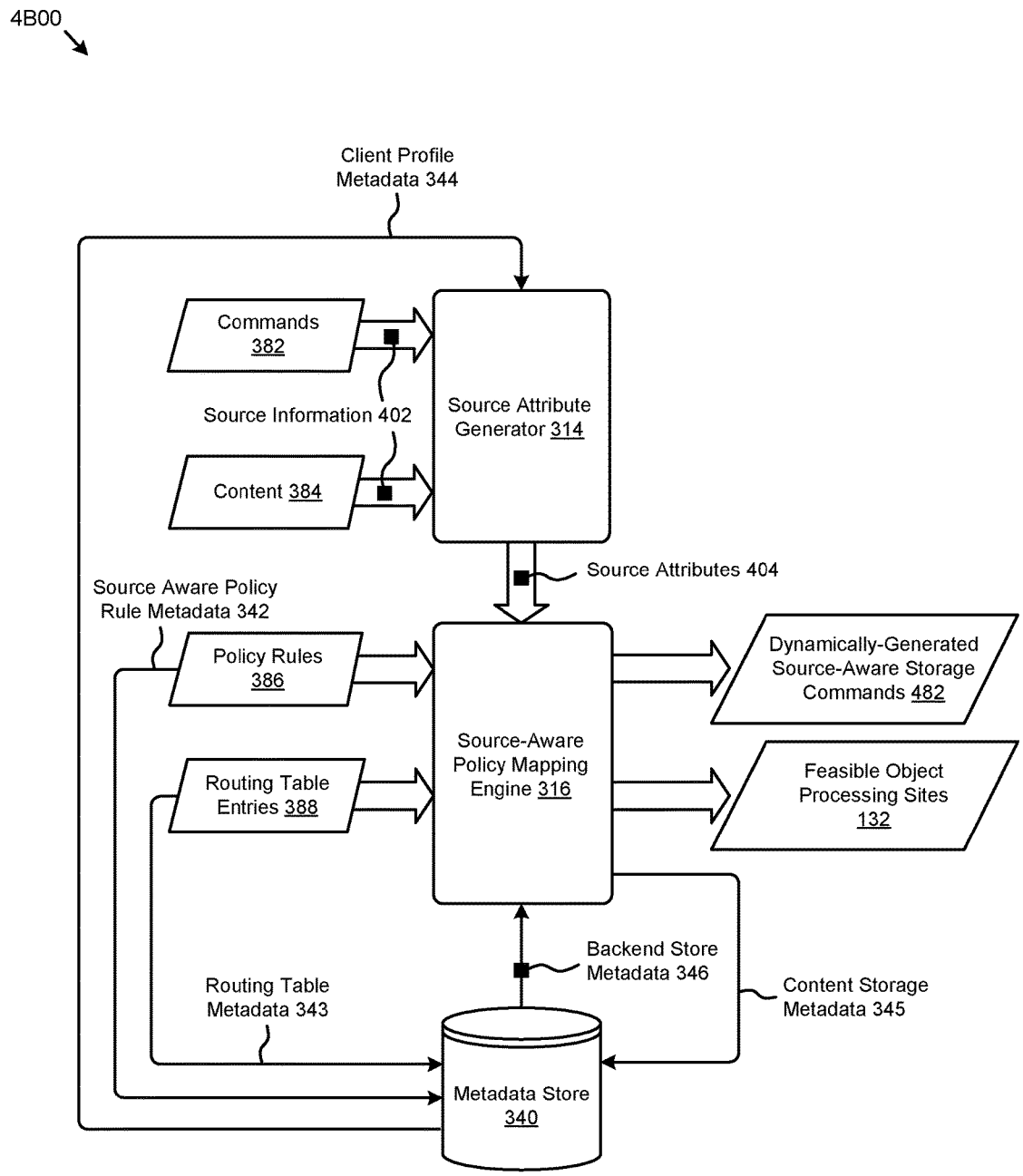
FIG. 4B illustrates a source-aware policy usage technique used in systems for accessing cloud-based content management resources using source-aware storage policies, according to some embodiments.

FIG. 4B illustrates a source-aware policy usage technique 4B00 used in systems for accessing cloud-based content management resources using source-aware storage policies. As an option, one or more instances of source-aware policy usage technique 4B00 or any aspect thereof may be implemented in the context of the architecture and functionality of the embodiments described herein. The source-aware policy usage technique 4B00 or any aspect thereof may be implemented in any desired environment.

The source-aware policy usage technique 4B00 shown in FIG. 4B can produce dynamically-generated source-aware storage commands 482. In some embodiments, a source-aware policy usage technique 4B00 might apply the source-aware storage policies to determine one or more feasible object processing sites 132 to facilitate selection of an object processing scenario.

Specifically, as shown, the source attribute generator 314 can receive input (e.g., commands 382 and content 384) comprising one or more forms of source information 403 that can be related to client profile metadata 344 so as to derive or determine one or more instances of source attributes 404. For example, the source information 403 might comprise a userID and an ipAddress that can be used to derive an SLA level and/or geographic or "geo" location, respectively, that can be included in the source attributes 404. The source attributes 404 can then be received by the source-aware policy mapping engine 316 and applied to the policy rules 386 to determine one or more policies and respective entries in the routing table metadata 343 to deploy based at least in part on the specific instance or instances of commands 382 received. The source-aware policy mapping engine 316 can then use the backend store metadata 346 and other information to construct any number of dynamically-generated source-aware storage commands 482 that are associated with or derived from the selected policies. In some cases, attributes describing the feasible object processing sites 132 can be generated for further processing according to the herein disclosed techniques. The source-aware policy mapping engine 316 and/or other components in the policy manager can further update the content storage metadata 345 when the storage commands have been successfully executed. Further details (e.g., schema, API, etc.) for the aforementioned metadata, information, attributes, and commands are described as pertains to FIG. 4C.

Figure 4C:
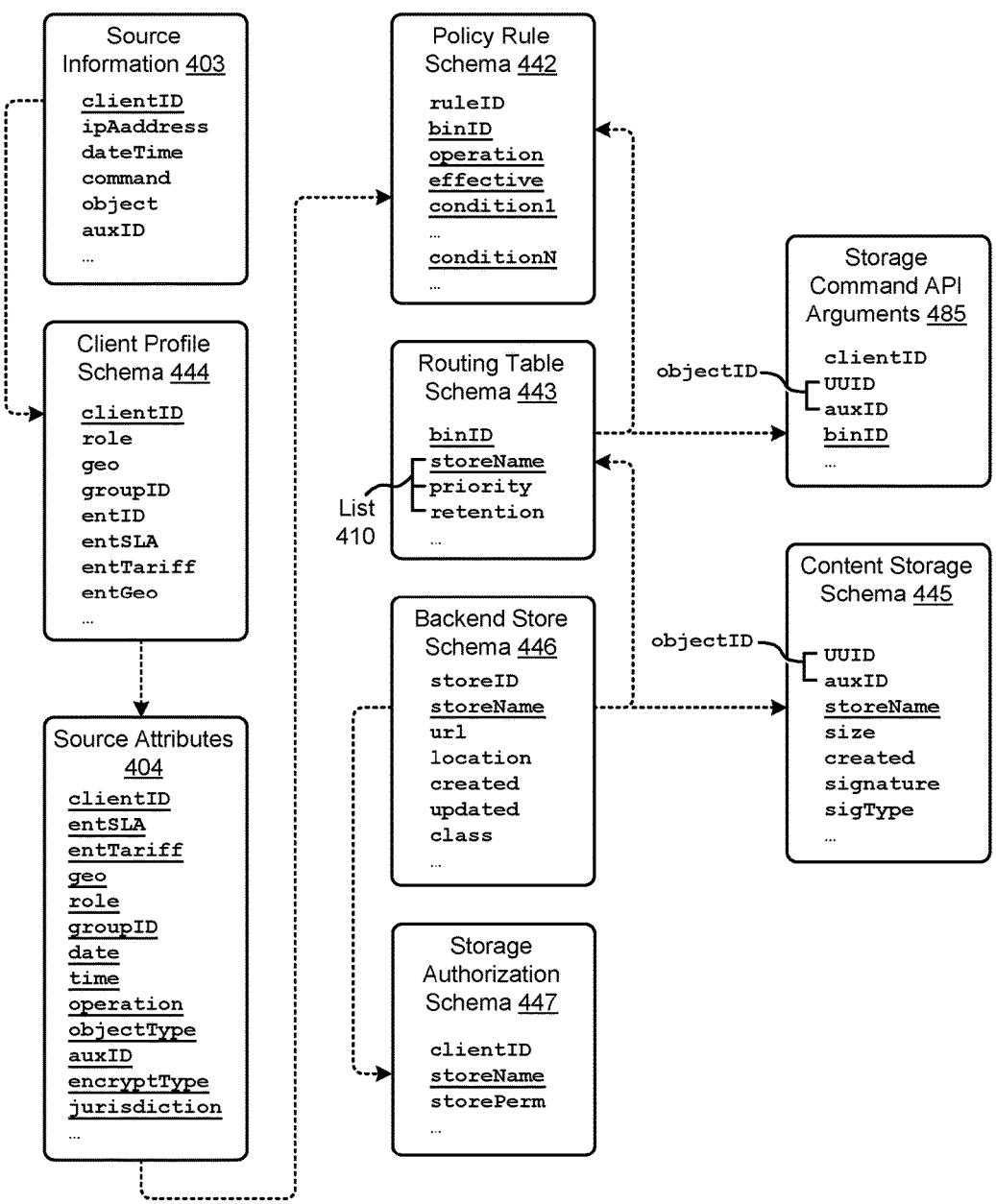
FIG. 4C depicts a diagram showing data structure relationships used in systems for accessing cloud-based content management resources using source-aware storage policies, according to some embodiments.

FIG. 4C depicts a diagram showing data structure relationships 4C00 used in systems for accessing cloud-based content management resources using source-aware storage policies. As an option, one or more instances of the data structure relationships 4C00 or any aspect thereof may be implemented in the context of the architecture and functionality of the embodiments described herein. The data structure relationships 4C00 or any aspect thereof may be implemented in any desired environment.

The shown data structure relationships 4C00 depict example information, attributes, schema, command arguments, and select entity relationships associated with data structures and datasets used in systems for accessing cloud-based content management resources using source-aware storage policies. Other information and relationships are possible. Specifically, the source information 403 (e.g., included in commands 382 and/or in content 384) can comprise clientID, ipAddress, dateTime, command information, object information, auxID, and might contain other information and/or be derived from other locations. For example, clientID, ipAddress, and dateTime might be session parameters captured in a log file or cookie. Also, for example, the auxID can be specified by the client and/or client application to identify one or more objects. As shown, the clientID in the source information 403 can be used to look up associated information in the client profile metadata 344. Specifically, for example, the client profile schema 444 shows such associated metadata might be a table having columns for the role, geo location, and groupID associated with the clientID, and columns for related enterprise level information including entID, entSLA, entTariff, entGeo, and other columns of information. The source information 403 and associated instances of client profile metadata 344 can be used (e.g., by source attribute generator 314) to generate descriptions (e.g., key-value pairs) to form instances of source attributes 404 such as clientID, entSLA, entTariff, geo, role, groupID, date, time, operation, objectType, auxID, encryptType, jurisdiction, and other attributes. For example, the source attributes 404 might comprise key-value pairs in the form of (for example) role=Admin, entSLA=Tier1, and geo=US.

As shown, the source attributes 404 can be applied to one or more source-aware policy rules codified in the source-aware policy rule metadata 342 and structured as described by the policy rule schema 442. Specifically, a policy rule can be described by a ruleID, a binID, an associated object processing operation, an effective time period, one or more conditions (e.g., condition1, . . . , conditionN), and other information. More specifically, certain instances of source attributes 404 (e.g., role=Admin, etc.) can be used (e.g., by source-aware policy mapping engine 316) as rule operands to determine the policy (e.g., binID="policyAdmin") to execute. The binID references a detailed policy definition stored in the routing table metadata 343 and structured according to the routing table schema 443. Specifically, the storage policies can be defined by a list 410 of one or more storage facilities described by a storeName, a priority attribute (e.g., synchronous, asynchronous, etc.), and a retention attribute (e.g., infinite, two weeks, in-process volatile, etc.). Other information can be used to describe a given policy. In some embodiments, the order of the storage facilities in the list 410 indicates a priority relationship and/or other relationships.

When such lists are communicated using JSON syntax, they can be referred to as "fragments". The storeName further references the backend store metadata 346 that can be structured according to the backend store schema 446. As shown by the backend store schema 446, the backend store metadata 346 describes the physical storage facility location associated with a portion of a given storage policy. In some cases, the physical storage facility referenced by storeName can represent a compute site that uses the storage facility to perform object processing. The storeName can also represent the various sites comprising a set of feasible object processing sites. In some cases, the backend store metadata 346 might comprise a table having columns for storeID, storeName, the storage facility URL, the storage path or directory location, a created time, an updated time, a class (e.g., 1=flash, 2=fastDisk, . . . , N=coldStorage), a backendType, a path, a layoutVersion indicator, a readOnly characteristic, and other columns. In some cases, the storeID can be a unique identifier associated with the instance of the policy manager $180_1$ communicating with a given storage facility and/or associated with the content management resource site comprising the given storage facility. A reference to the storeName can further be included in the storage authorization metadata 347, as shown in the storage authorization schema 447, and used with permissions storePerm and other information to determine if client clientID is authorized to access storeName.

Embodiments of content storage metadata 345 can be created and/or updated and/or accessed according to content storage schema 445. Specifically, as shown, each row in the content storage metadata 345 table can comprise columns for a uuID, the auxID, the storeName, a stored object size, a created time, an encryption signature, and a signature type sigType (e.g., SHA-1, etc.).

Any aspects of encryption, including aspects of the aforementioned internal key service can be referenced and/or included content storage metadata. Further details regarding general approaches to encryption are described in U.S. application Ser. No. 14/472,540 titled "ENHANCED REMOTE KEY MANAGEMENT FOR AN ENTERPRISE IN A CLOUD-BASED ENVIRONMENT" filed on Aug. 29, 2014, which is hereby incorporated by reference in its entirety.

The storeName can reference a specific store location described in the backend store metadata 346. In some embodiments, the UUID and the storeID can be the same, globally unique identifier to reduce storage command complexities. In one or more embodiments, the auxID can be concatenated to the UUID to form an objectID. For example, the auxID can be used to distinguish various representations of the same originating content object. In other embodiments, a containerID and/or the auxID and/or the objectID and/or the UUID are used in respective contexts.

Given the aforementioned information, attributes, schema, entity relationships, and other such data, the dynamically-generated source-aware storage commands 482 described in FIG. 4B can be constructed, in whole or in part, by using storage command API arguments. Specifically, as shown, storage command API arguments 485 comprise the clientID, the objectID (e.g., the UUID and the auxID), the binID, and other arguments. According to the herein disclosed techniques, a storage command API using the storage command API arguments 485 can be can used to issue (e.g., by the provider interface module 324 of the policy manager $180_1$ as shown in FIG. 3) dynamically-generated source-aware storage commands 482 to one or more content storage facilities. In one or more embodiments, such a storage command API can comprise the commands shown in Table 1 and Table 2 below.

TABLE 1

Storage Command API - Content Access Operations

| Ref | Information |
|---|---|
| 1 | Generate Object UUID<br>POST storage/<clientID>/<binID> |
| 2 | Upload an Object<br>PUT storage/<clientID>/<binID>/<objectID> |
| 3 | Upload Multiput Object<br>PUT storage/<clientID>/<binID>/<objectID>?part=<N> |
| 4 | Get Status of Multiput Object Upload<br>GET storage/<clientID>/<binID>/<objectID>?status |
| 5 | Commit Multiput Object<br>POST storage/<clientID>/<binID>/<objectID>?commit |
| 6 | Download an Object<br>GET storage/<clientID>/<binID>/<objectID> |
| 7 | Delete Object<br>DELETE storage/<clientID>/<binID>/<objectID> |
| 8 | List Objects Associated with UUID<br>GET storage/<clientID>/<binID>/<UUID>?list |
| 9 | Get Byte Offset of Incomplete Upload<br>HEAD storage/<clientID>/<binID>/<objectID> |

TABLE 2

Storage Command API - Management Operations

| Ref | Information |
|---|---|
| 1 | Upload Content Storage Metadata<br>PUT storage/<clientID>/<binID>/<objectID>?metadata |
| 2 | Get Object Info<br>GET storage/<clientID>/<binID>/<objectID>?info |
| 3 | Create New Backend Store<br>POST storageid |
| 4 | Update Metadata for Backend Store<br>PUT storageid/<storeID> |
| 5 | Update Select Metadata for Backend Store<br>PATCH storageid/<storeID> |
| 6 | Get Metadata for a Backend Store<br>GET storageid/<storeID> |
| 7 | Delete a Backend Store<br>DELETE storageid/<storeID> |
| 8 | Get Metadata for all Backend Stores<br>GET storageid/db |
| 9 | Get Metadata for Cached Backend Stores<br>GET storageid/cache |
| 10 | Reload Backend Store Cache from Database<br>PUT storageid/reload |
| 11 | Create or Update Storage Policy<br>PUT policy/<binID> |
| 12 | Delete a Storage Policy<br>DELETE policy/<binID> |
| 13 | Get Metadata for all Storage Policies<br>GET policy/db |
| 14 | Get Metadata for Cached Storage Policies<br>GET policy/cache |
| 15 | Reload Storage Policy Cache from Database<br>PUT policy/reload |

Figure 5A:
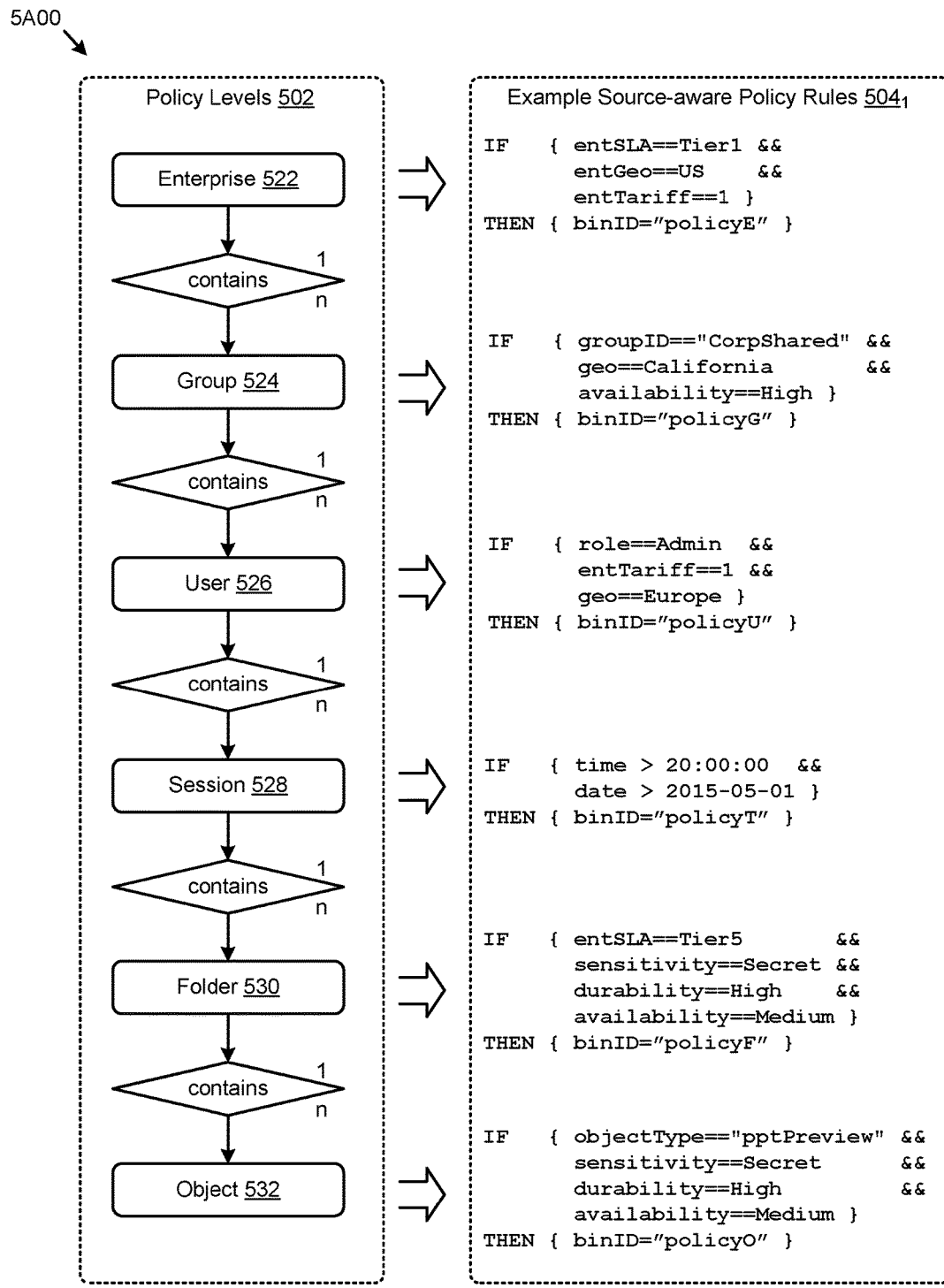
FIG. 5A presents a diagrammatic representation of a source-aware rule selection hierarchy as used in systems that access cloud-based content management resources using source-aware storage policies, according to an embodiment.

FIG. 5A is a diagrammatic representation of a source-aware rule selection hierarchy 5A00 as used in systems that access cloud-based content management resources using source-aware storage policies. As an option, one or more instances of the source-aware rule selection hierarchy 5A00 or any aspect thereof may be implemented in the context of the architecture and functionality of the embodiments described herein. The source-aware rule selection hierarchy 5A00 or any aspect thereof may be implemented in any desired environment.

The source-aware rule selection hierarchy 5A00 presents merely one embodiment and example of various source-aware policy rules and their relationships that can be used in the herein disclosed systems for accessing cloud-based content management resources using source-aware storage policies. Specifically, certain policy levels 502 and a respective set of pseudo-code from the example source-aware policy rules 504₁ are shown.

More specifically, the policy levels 502 show that the "Enterprise" can be the parent policy level (entity 522) and have a one-to-many (e.g., 1:n) relationship with a "Group" policy level (entity 524), which can, in turn, have a one-to-many relationship with a "User" policy level (entity 526). For example, one enterprise (e.g., Company ABC) might have multiple groups (e.g., finance, engineering, etc.), and each group might comprise multiple users (e.g., characterized by a user role). A given user can have a one-to-many relationship with a "Session" policy level (entity 528). For example, the user might log in to an application (e.g., content management application 304) on Monday at 09:02 am to establish a first session, and then log in again on Tuesday at 02:32 pm to establish a second session. Further, in a given session, a user might work with various content folders having policies that are applied at a "Folder" policy level (entity 530), and each folder might have multiple content objects (e.g., files) with associated policies at an "Object" policy level (entity 532).

In one or more embodiments, each level in policy levels 502 can have one or more source-aware policy rules that are checked to dynamically determine the one or more policies to apply in executing storage commands invoked by a user according to the herein disclosed techniques and approaches. In some embodiments, the rules associated with lower levels in the policy hierarchy can override rules associated with higher levels. Specifically, the example source-aware policy rules 504₁ illustrate the conditional logic (e.g., operands, operators, results, etc.) that can be used to implement policy rules in systems for accessing cloud-based content management resources using source-aware storage policies. For example, at the "Enterprise" level, a policy rule might check enterprise-related source attributes (e.g., entSLA, entGeo, and entTariff) for certain respective conditions (e.g., Tier1, US, and 1) and, if all are satisfied, then apply the policy binID="policyE". If a user (e.g., an administrator from Europe) from the same enterprise logs into the application, then the "User" level policy rule will override the "Enterprise" rule, and the policy applied will be binID="policyU". Other policy rules at other policy levels are possible.

Figure 5B:
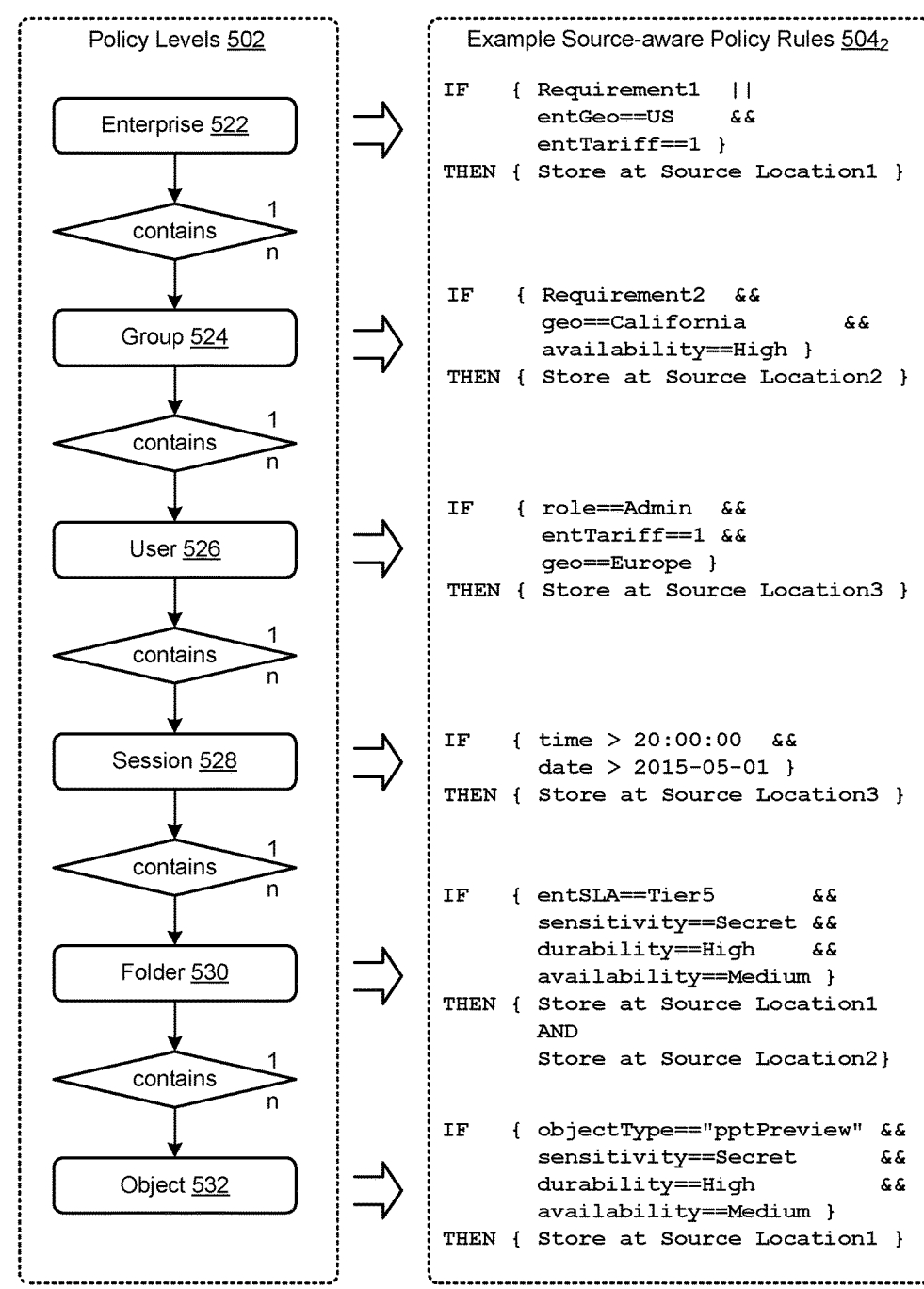
FIG. 5B presents a diagrammatic representation of a source-aware storage location selection hierarchy as used in systems that access cloud-based content management resources using source-aware storage policies, according to an embodiment.

FIG. 5B presents a diagrammatic representation of a source-aware storage location selection hierarchy 5B00 as used in systems that access cloud-based content management resources using source-aware storage policies. As an option, one or more instances of source-aware storage location selection hierarchy 5B00 or any aspect thereof may be implemented in the context of the architecture and functionality of the embodiments described herein. The source-aware storage location selection hierarchy 5B00 or any aspect thereof may be implemented in any desired environment.

The source-aware storage location selection hierarchy 5B00 presents merely one embodiment and example of applying source-aware policy rules at various hierarchical levels to determine one or more target storage locations. Specifically, policy levels 502 earlier described in FIG. 5A and a respective set of pseudo-code from the example source-aware policy rules 504₂ are shown. In one or more embodiments, each level in policy levels 502 can have one or more source-aware policy rules that are checked to dynamically determine one or more storage locations that comply with the respective policies. In some embodiments, the rules associated with lower levels in the policy hierarchy can override rules associated with higher levels. Specifically, the example source-aware policy rules 504₂ illustrate the conditional logic (e.g., operands, operators, results, etc.) that can be used to implement policy rules in systems for accessing cloud-based content management resources using source-aware storage policies. For example, at the "Enterprise" level, a policy rule might check enterprise-related requirements (e.g., Requirement 1) and/or source attributes (e.g., entGeo and entTariff) for certain respective conditions (e.g., Tier1, US, and 1) and, if all are satisfied, then selected Source Location 1 as the storage location. If the session is invoked after 20:00:00 hours after the effective date of 2015 May 1, Source Location 3 will be identified as the storage location. Other policy rules and/or storage locations at other policy levels are possible.

Figure 5C:
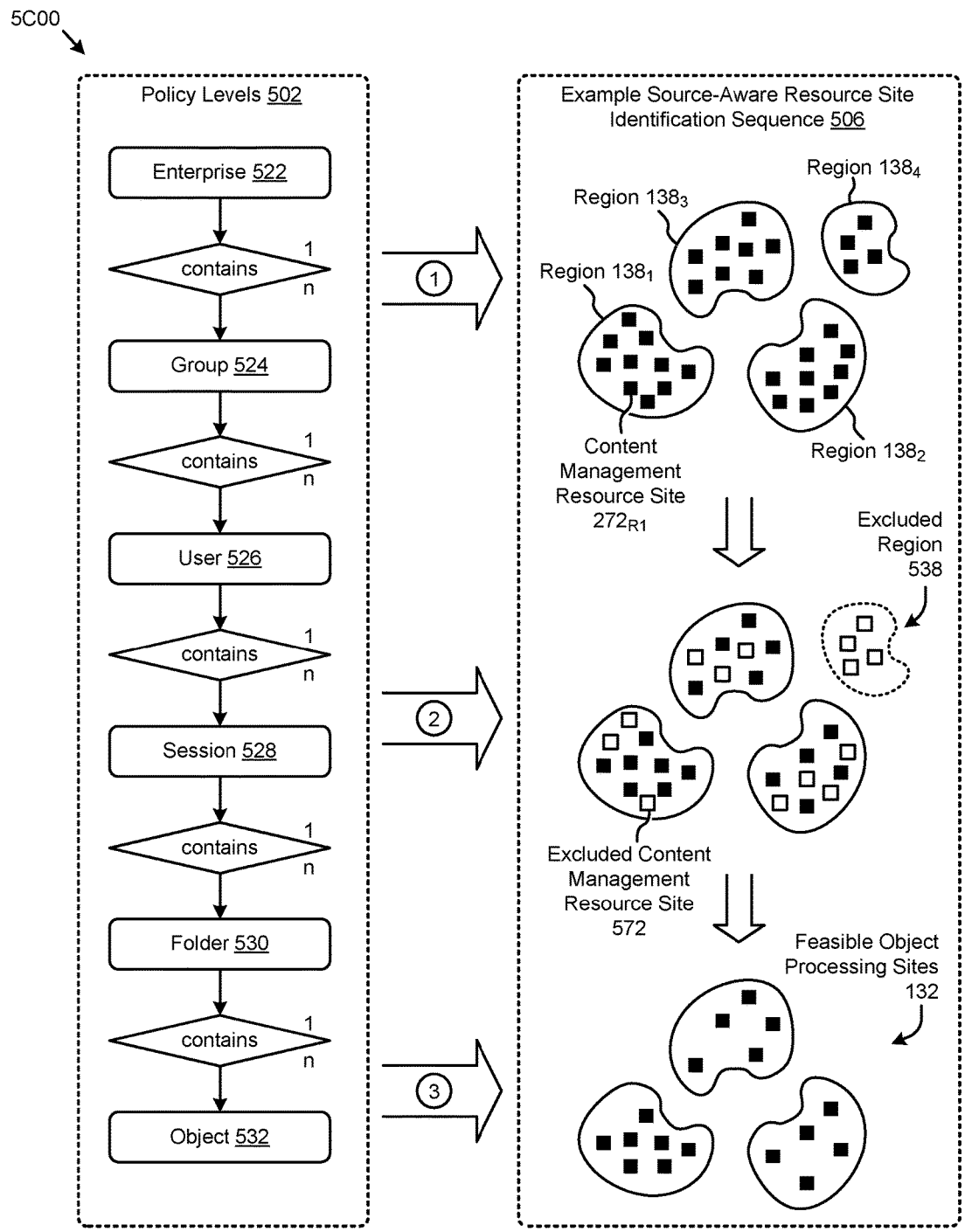
FIG. 5C presents a feasible object processing site identification technique as used in systems that access cloud-based content management resources using source-aware storage policies, according to an embodiment.

FIG. 5C presents a feasible object processing site identification technique 5C00 as used in systems that access cloud-based content management resources using source-aware storage policies. As an option, one or more instances of feasible object processing site identification technique 5C00 or any aspect thereof may be implemented in the context of the architecture and functionality of the embodiments described herein. The feasible object processing site identification technique 5C00 or any aspect thereof may be implemented in any desired environment.

The feasible object processing site identification technique 5C00 presents merely one embodiment and example of applying source-aware policy rules at various hierarchical levels to identify one or more object processing sites for executing certain content object operations (e.g., compute operations, storage operations, etc.). Specifically, policy levels 502 earlier described in FIG. 5A and an example source-aware resource site identification sequence 506 are shown.

In one or more embodiments, each level in policy levels 502 can have one or more source-aware policy rules that are checked to dynamically select one or more content management resources sites (e.g., content management resource site 272$_{R1}$) in one or more regions (e.g., region 138₁, region 138₂, region 138₃, or region 138₄) that comply with the respective policies. In some embodiments, the rules associated with lower levels in the policy hierarchy can override rules associated with higher levels. For example, near the higher levels in the hierarchy (e.g., the "Enterprise" level and the "Group" level), the source-aware policy rules associated with a given object processing command or set of commands might identify a certain number of content management resource sites and regions that can be used to execute the commands (stage 1). As the source-aware policies associated with lower levels in the hierarchy (e.g., the "User" level and the "Session" level) are applied, some regions (e.g., excluded region 538) and/or some resource sites (e.g., excluded content management resource site 572) might be excluded (stage 2). When the source-aware policies and policy rules for all of the policy levels 502 have been applied, a set of feasible object processing sites 132 can be identified (stage 3).

Figure 6A:
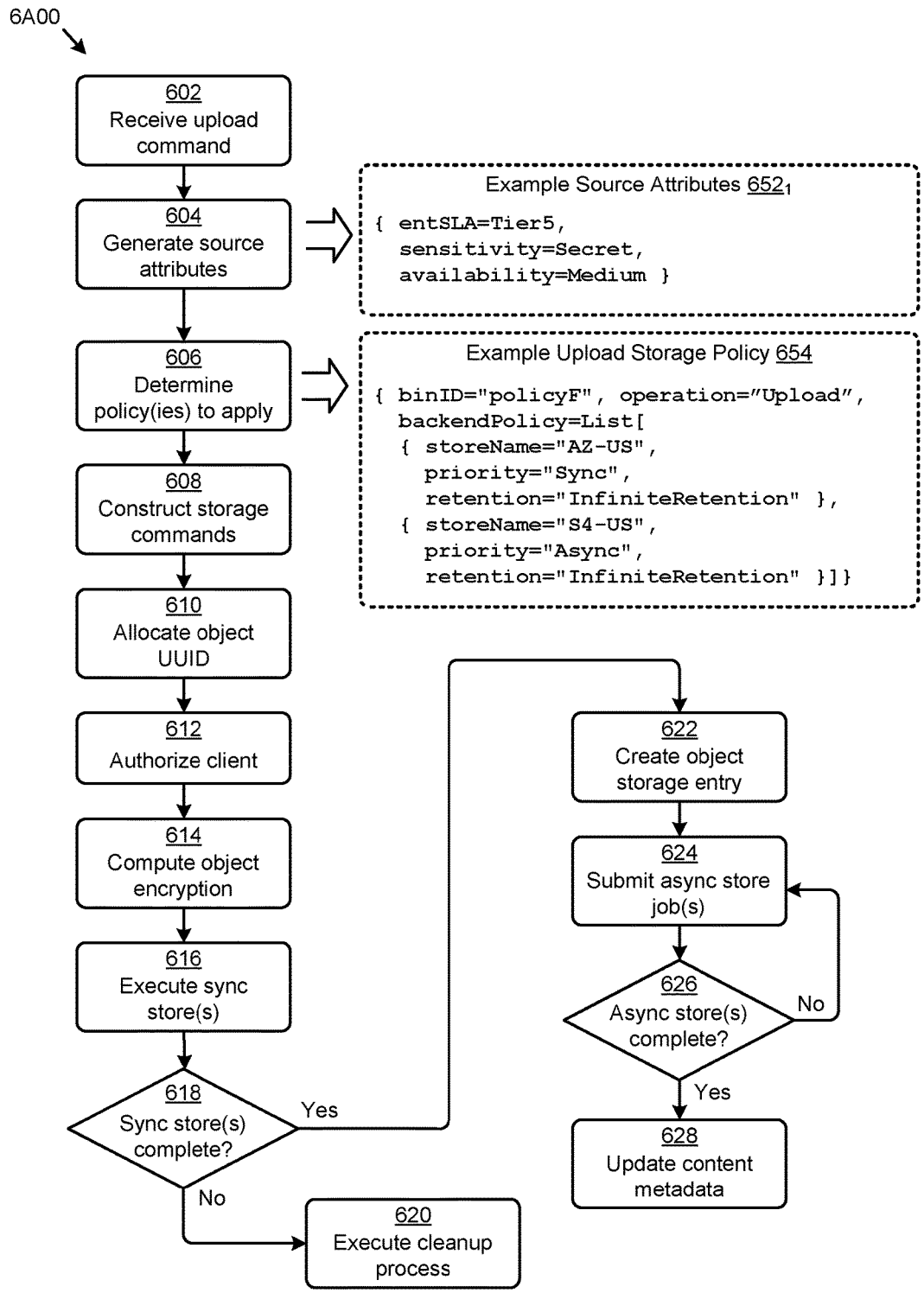
FIG. 6A is a flow diagram illustrating a content upload operation as used in systems that access cloud-based content management resources using source-aware storage policies, according to an embodiment.

FIG. 6A is a flow diagram illustrating a content upload operation 6A00 as used in systems that access cloud-based content management resources using source-aware storage policies. As an option, one or more instances of content upload operation 6A00 or any aspect thereof may be implemented in the context of the architecture and functionality of the embodiments described herein. The content upload operation 6A00 or any aspect thereof may be implemented in any desired environment.

The content upload operation 6A00 presents one embodiment of certain steps for uploading content (e.g., objects) in the herein disclosed systems that access cloud-based content management resources using source-aware storage policies. In one or more embodiments, the steps and underlying operations comprising the content upload operation 6A00 can be executed by a policy manager, such as the policy manager $180_1$ in system 300 as shown and described pertaining to FIG. 3. Certain example source attributes $652_1$ and an example upload storage policy 654 are also shown for reference.

Specifically, the content upload operation 6A00 can commence with the policy manager receiving an upload command (step 602). The command and associated object or objects can be used with various other information (e.g., client profile metadata 344) to generate source attributes (step 604), such as the example source attributes $652_1$. The source attributes can then be used (e.g., as inputs to various policy rules) to determine one or more upload storage policies to apply to the upload (step 606). For example, the source attributes and policy rules might indicate that the policy "policyF" should be applied. As shown in the example upload storage policy 654, policy "policyF" calls for a first priority synchronous store to "AZ-US" with infinite retention, and a second priority asynchronous store to "S4-US" with infinite retention. The policy manager can then construct the storage commands required to execute the selected policy at the specified storage facilities (step 608). In some embodiments, the policy manager can allocate the UUID for the object (step 610), authorize the client for accessing the storage facilities associated with the selected binID (step 612), and compute the object signature and/or encryption (step 614).

The policy manager can then issue commands to execute the synchronous stores specified in the selected policy (step 616). The synchronous stores are then checked for completion (decision 618). If the synchronous stores do not complete successfully, a cleanup process is executed (step 620) and the flow can return an error and end. When the synchronous stores successfully completes, an object storage entry (e.g., a row in content storage metadata) is created (step 622). Any asynchronous store jobs associated with the selected policy can then be submitted (step 624). For example, the asynchronous jobs can be submitted to a queuing service in the policy manager for asynchronous execution. More specifically, in one or more embodiments, the queuing service can use the capability of the policy manager and the storage command API (e.g., see Table 1 and Table 2) to execute asynchronous replication stores (e.g., GET sync store object and PUT async store replication object). When the asynchronous stores are complete (decision 626), the content storage metadata can be updated with the asynchronous store information (step 628).

Figure 6B:
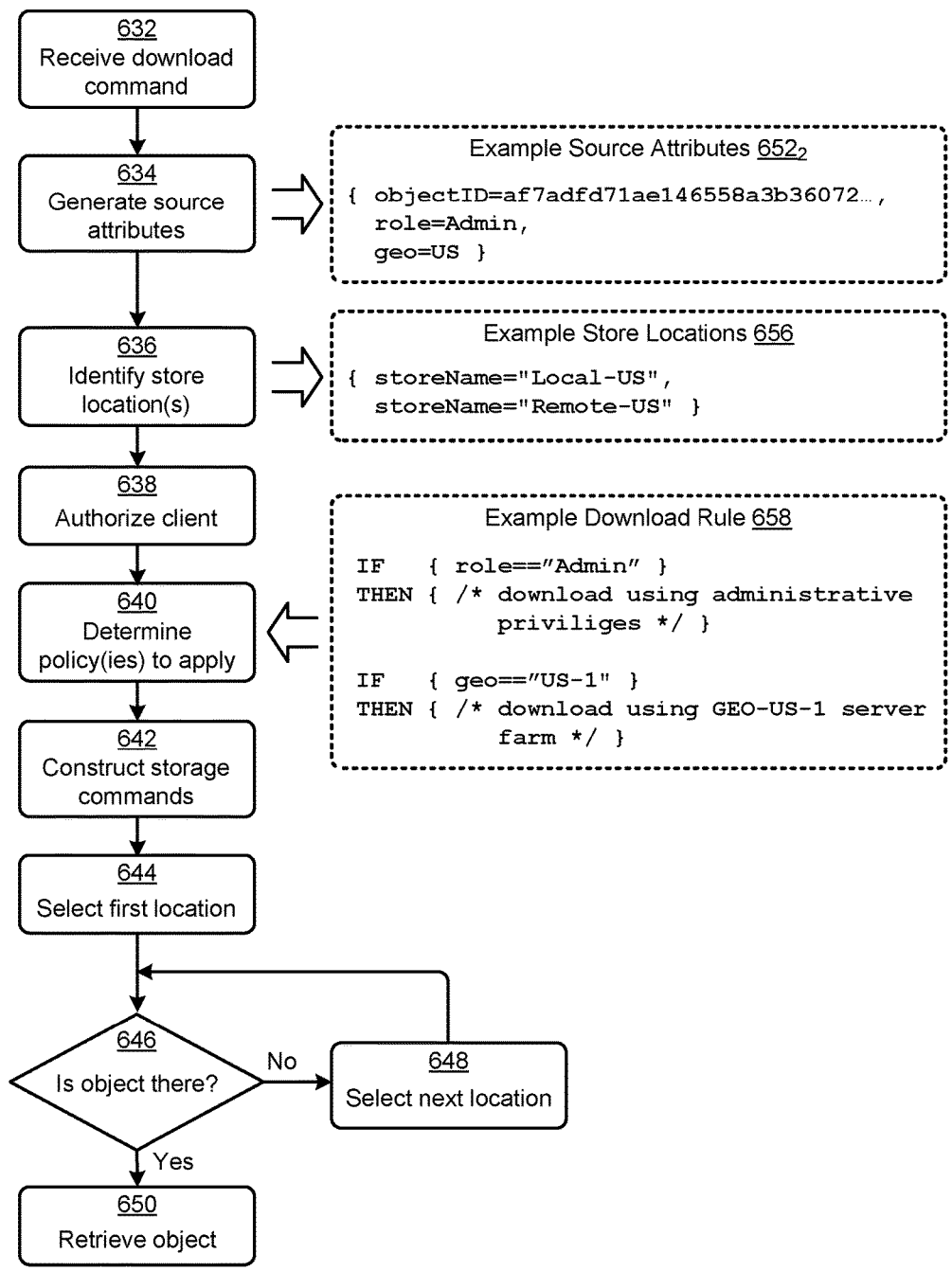
FIG. 6B is a flow diagram illustrating a content download operation as used in systems that access cloud-based content management resources using source-aware storage policies, according to an embodiment.

FIG. 6B is a flow diagram illustrating a content download operation 6B00 as used in systems that access cloud-based content management resources using source-aware storage policies. As an option, one or more instances of content download operation 6B00 or any aspect thereof may be implemented in the context of the architecture and functionality of the embodiments described herein. The content download operation 6B00 or any aspect thereof may be implemented in any desired environment.

The content download operation 6B00 presents one embodiment of certain steps for downloading content (e.g., objects) in the herein disclosed systems that access cloud-based content management resources using source-aware storage policies. In one or more embodiments, the steps and underlying operations comprising the content download operation 6B00 can be executed by a policy manager, such as the policy manager $180_1$ in system 300 as shown and described pertaining to FIG. 3. Certain example source attributes $652_2$, example store locations 656, and example download rules 658 are shown for reference.

Specifically, the content download operation 6B00 can commence with the policy manager receiving a download command (step 632). The command and associated object or objects can be used with various other information (e.g., an access key, items drawn from client profile metadata, etc.) to generate source attributes (step 634) such as the example source attributes $652_2$. The source attributes and access key can then be used to identify and access the various target storage locations for the object (step 636). For example, the objectID in the example source attributes $652_2$ can be used to query certain content storage metadata and determine that the object is stored at "Local-US" and "Remote-US" as shown in the example store locations 656. The policy manager can then authorize the client to access the identified storage locations (step 638). Once authorized, the source attributes can be used (e.g., as inputs to various policy rules) to determine one or more download storage policies to apply to the download (step 640).

For example, as shown in the example download rule 658, if role=Admin, then the download should use administrative privileges. Since the example source attributes $652_2$ indicate geo=US, the nearest location is storeName="Local-US". As another example, a download policy might indicate that all replications be checked for integrity at each download, or at every $100^{th}$ download, etc. The policy manager can then construct the storage commands required to execute the selected policy (step 642). The policy manager can then select the first target storage location (step 644) and check for the existence of the object (decision 646). For example, the storage facility "Local-US" can be checked using the HEAD command. If the object is not there, the next location specified by the policy can be selected (step 648) and the check repeated. If the object is confirmed to be in the selected location, the object can be retrieved (step 650).

Figure 7:
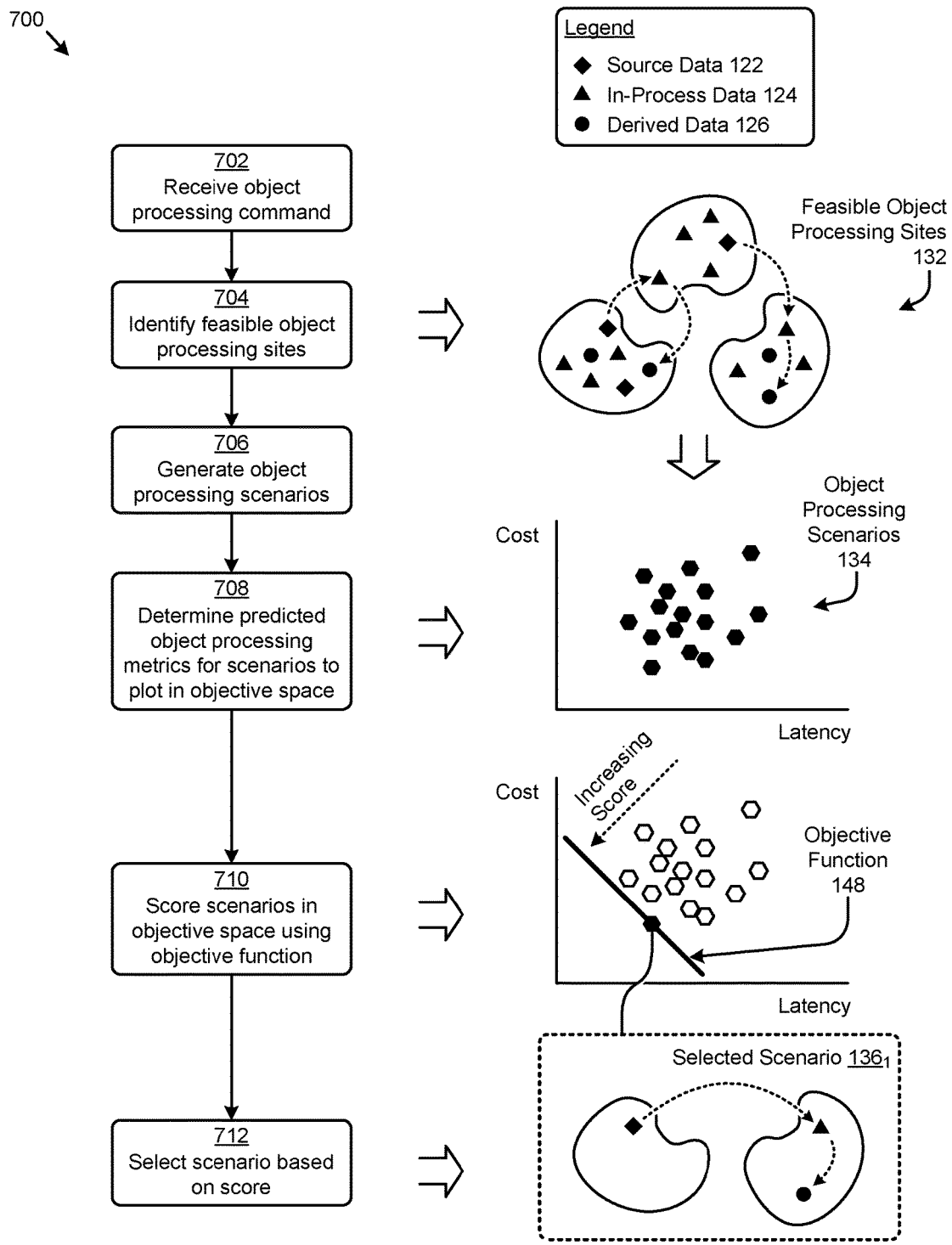
FIG. 7 depicts an objective-based processing scenario selection technique as used in systems that access cloud-based content management resources using source-aware storage policies, according to an embodiment.

FIG. 7 depicts an objective-based processing scenario selection technique 700 as used in systems that access cloud-based content management resources using source-aware storage policies. As an option, one or more instances of objective-based processing scenario selection technique 700 or any aspect thereof may be implemented in the context of the architecture and functionality of the embodiments described herein. The objective-based processing scenario selection technique 700 or any aspect thereof may be implemented in any desired environment.

The objective-based processing scenario selection technique 700 presents one embodiment of certain steps and/or operations for selecting one or more object processing scenarios based at least in part one or more objectives according to the herein disclosed techniques. In one or more embodiments, the steps and underlying operations comprising objective-based processing scenario selection technique 700 can be executed by a policy manager, a scenario generator, and a scenario selection engine such as shown and described as pertains to FIG. 1C. Certain illustrations corresponding to the steps and/or operations comprising objective-based processing scenario selection technique 700 are also shown for reference.

Specifically, objective-based processing scenario selection technique 700 can commence with receiving a content object processing command (step 702). For example, the command might comprise compute operations and/or storage operations to be executed using cloud-based content management resources. Using the herein disclosed techniques, a set of feasible object processing sites from such cloud-based content management resources can be identified (step 704). For example, the shown set of feasible object processing sites 132 can be determined at least in part by various source-aware storage policies applied the source data 122, the in-process data 124, and the derived data 126 associated with the object processing command.

Given the set of feasible object processing sites, various scenarios for executing the object processing command can be generated (step 706). As merely examples, two representative scenarios are shown using respective combinations of the feasible object processing sites 132 to execute the received object processing command. To facilitate comparison of the generated scenarios, one or more predicted object processing metrics can be determined for the scenarios to plot them in a common objective space (step 708).

For example, cost metrics and latency metrics can be determined for each respective instance of the object processing scenarios 134 to plot them in an objective space defined by a cost dimension and a latency dimension. Any number of other objectives are possible. An objective function relating the objectives (e.g., cost and latency) in the objective space can be used to determine scenario scores for the object processing scenarios (step 710). As an example, the objective function 148 might have a slope of 1 indicating that cost and latency are equally weighted. Other slopes, polynomial orders, and/or other characteristics pertaining to the objective function are possible. As shown, higher (or lower) scores might correspond to scenarios having increasingly lower (e.g., minimized) cost and latency metrics. In other cases, higher (or lower) scores might correspond to maximizing certain objectives (e.g., availability). The scores can then be used to select the scenario for executing the object processing command (step 712), which selected scenario might involve multiple regions.

In some cases, the score of one or more scenarios might be improved by taking certain actions pertaining to the cloud-based storage system. For example, adding a compute node or additional low latency (e.g., solid state drive (SSD)) storage capacity to a given resource site might improve the score of a scenario using that site so as to exceed the then-current highest score. Historical processing and scenario score data might further characterize the impact such actions might have on other transactions. The cloud-based system provider might desire access to such data and/or recommended actions when managing the cloud-based content management system.

Figure 8:
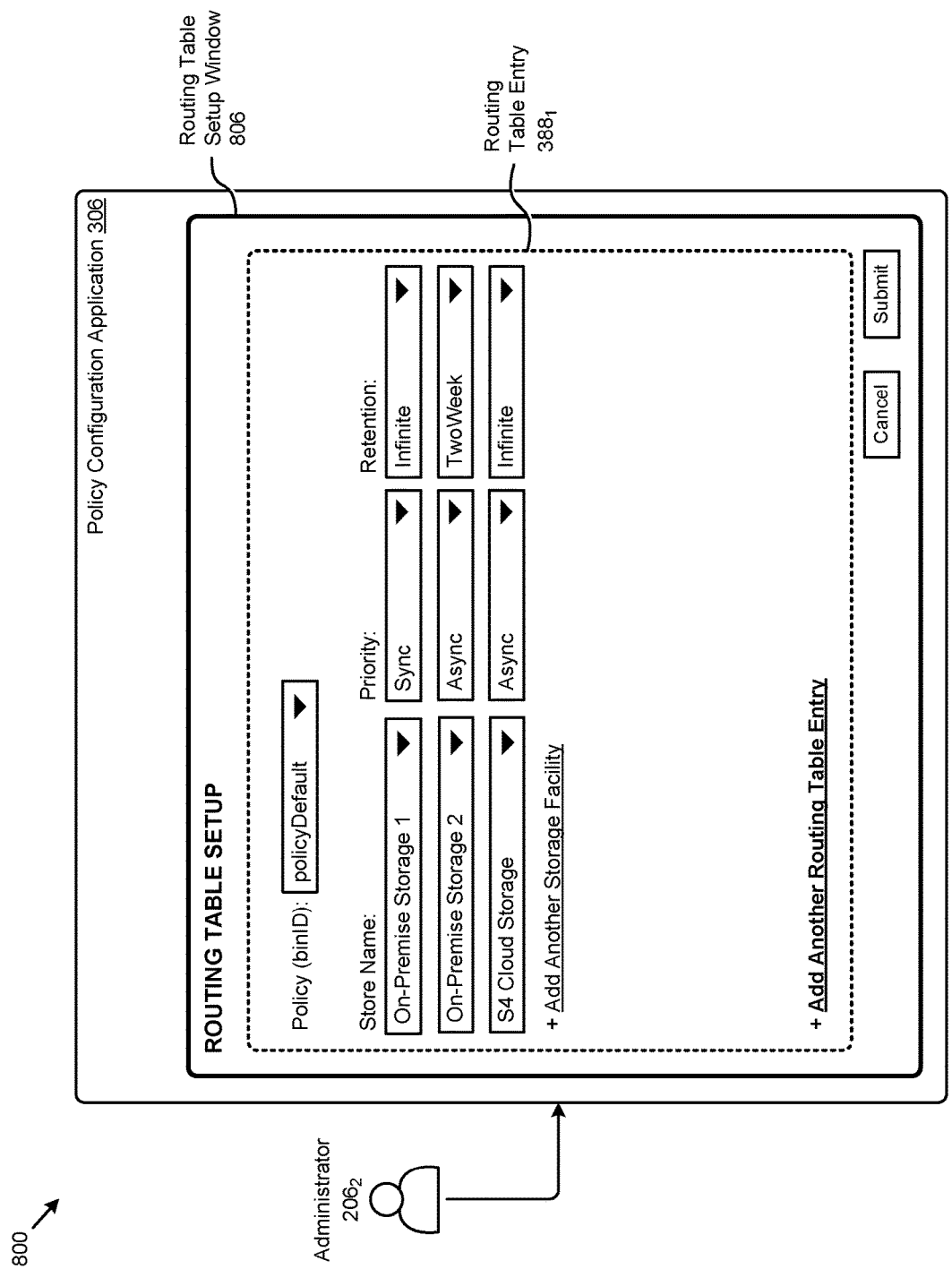
FIG. 8 exemplifies a policy routing user interface for specifying policy routing tables in systems for accessing cloud-based content management resources using source-aware storage policies, according to some embodiments.

FIG. 8 exemplifies a policy routing user interface 800 for specifying policy routing tables in systems for accessing cloud-based content management resources using source-aware storage policies. As an option, one or more instances of policy routing user interface 800 or any aspect thereof may be implemented in the context of the architecture and functionality of the embodiments described herein. The policy routing user interface 800 or any aspect thereof may be implemented in any desired environment.

Specifically, the policy routing user interface 800 shown in FIG. 8 can be used by a user or an administrator $206_2$ to establish the routing table entries 388 that comprise the routing table metadata 343 as depicted in system 300. More specifically, the policy routing user interface 800 can comprise a routing table setup window 806 that is part of the policy configuration application 306. As shown, the routing table setup window 806 can present various input entry elements (e.g., dropdown selections, text boxes, etc.) through which the administrator $206_2$ can associate various storage facilities and storage facility attributes (e.g., Store Name, Priority, Retention, etc.) with a given policy. Such an association can comprise an instance of a routing table entry $388_1$ that can be stored in the routing table metadata 343.

For example, the administrator can define a policy "policyDefault" having a first priority synchronous store to "ON-PREMISE STORAGE 1" with infinite retention, a second priority asynchronous store to "ON-PREMISE STORAGE 2" with a two-week retention, and a third priority asynchronous store to "S4 Cloud Storage" with infinite retention. In some embodiments, the selections can be from a list of available options (e.g., from the policy taxonomy metadata 348).

In some cases, multiple policies might apply in a particular situation. In such cases, it is possible that there is a conflict among the multiple policies. One possible technique to resolve a conflict is to select the "first policy", or another possible technique to resolve a conflict is to select the "last policy". Yet another possible technique to resolve a conflict is to cascade or merge or intersect aspects of the policies and/or to apply heuristics to resolve policies or aspects thereto that are deemed to conflict. It is also possible to enter policies through a policy rules user interface that aids a user when entering policies such that new policies that conflict with pre-existing policies are not stored unless a resolution technique is also specified.

Figure 9A:
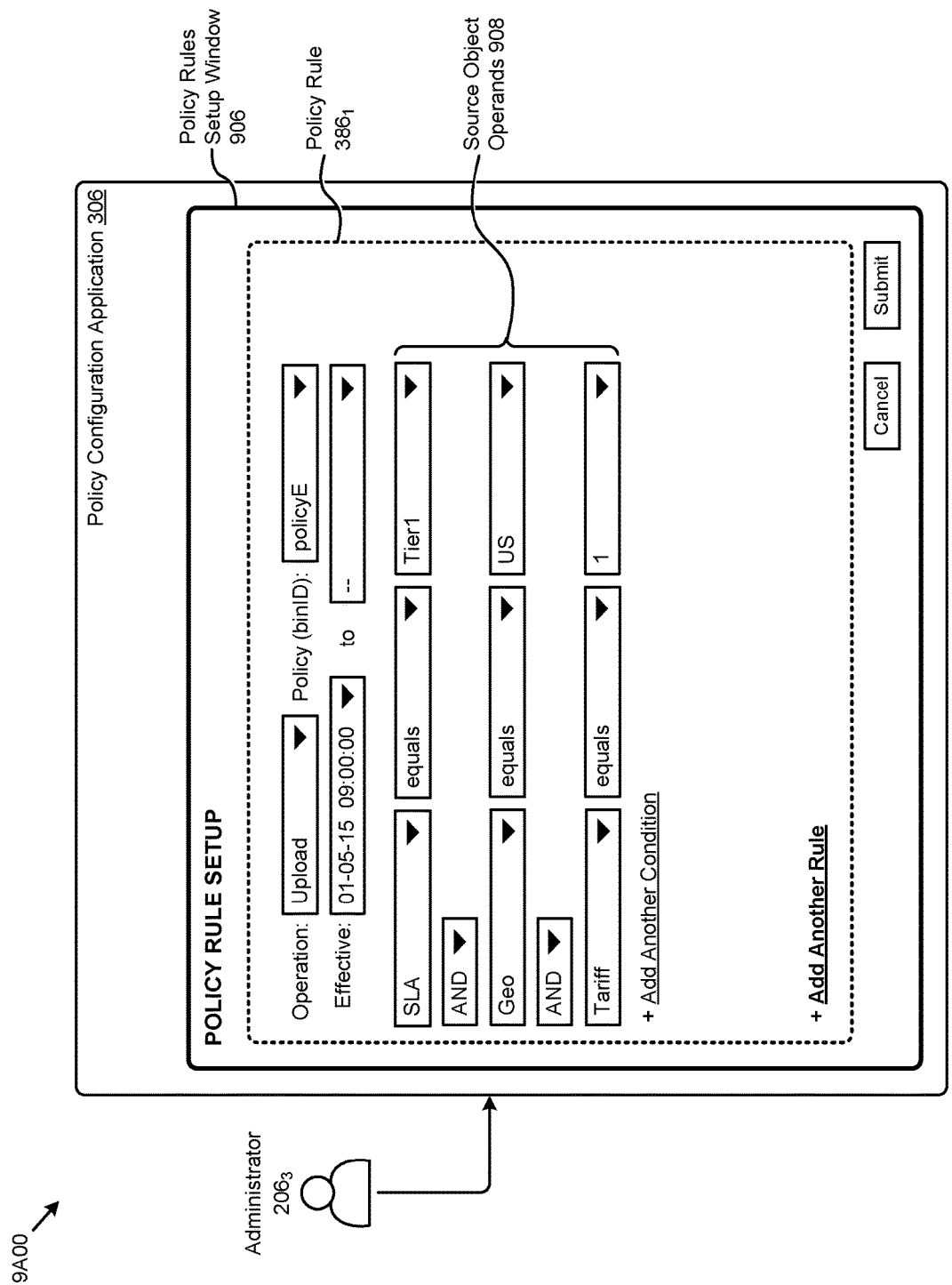
FIG. 9A exemplifies a policy rules user interface for specifying policy rules in systems for accessing cloud-based content management resources using source-aware storage policies, according to some embodiments.

FIG. 9A exemplifies a policy rules user interface 9A00 for specifying policy rules in systems for accessing cloud-based content management resources using source-aware storage policies. As an option, one or more instances of policy rules user interface 9A00 or any aspect thereof may be implemented in the context of the architecture and functionality of the embodiments described herein. The policy rules user interface 9A00 or any aspect thereof may be implemented in any desired environment.

Specifically, the policy rules user interface 9A00 shown in FIG. 9A can be used by an administrator $206_3$ to establish the policy rules 386 that comprise the source-aware policy rule metadata 342 as depicted in system 300. More specifically, the policy rules user interface 9A00 can comprise a policy rules setup window 906 that is part of the policy configuration application 306. As shown, the policy rules setup window 906 can present various input entry elements (e.g., dropdown selections, text boxes, etc.) through which the administrator $206_3$ can associate various rules (e.g., conditional logic, etc.) and filters (e.g., Operation, Effective, etc.) with a given policy. Such an association can comprise an instance of a policy rule $386_1$ that includes one or more source object operands 908 (e.g., source object operand for "SLA", source object operand for "Geo", source object operand for "Tariff", etc.) that can be stored in the source-aware policy rule metadata 342.

For example, the administrator $206_3$ can associate a policy "policyE" with an "Upload" storage operation, an effective time period starting on "01-05-15 09:00:00" and having no end, and a multi-part conditional logic (e.g., SLA=Tier1 AND Geo=US AND Tariff=1). When all specified conditions are satisfied, the policy "policyE" can be selected. In some embodiments, the selections can be from a list of available options (e.g., from the policy taxonomy metadata 348).

Figure 9B:
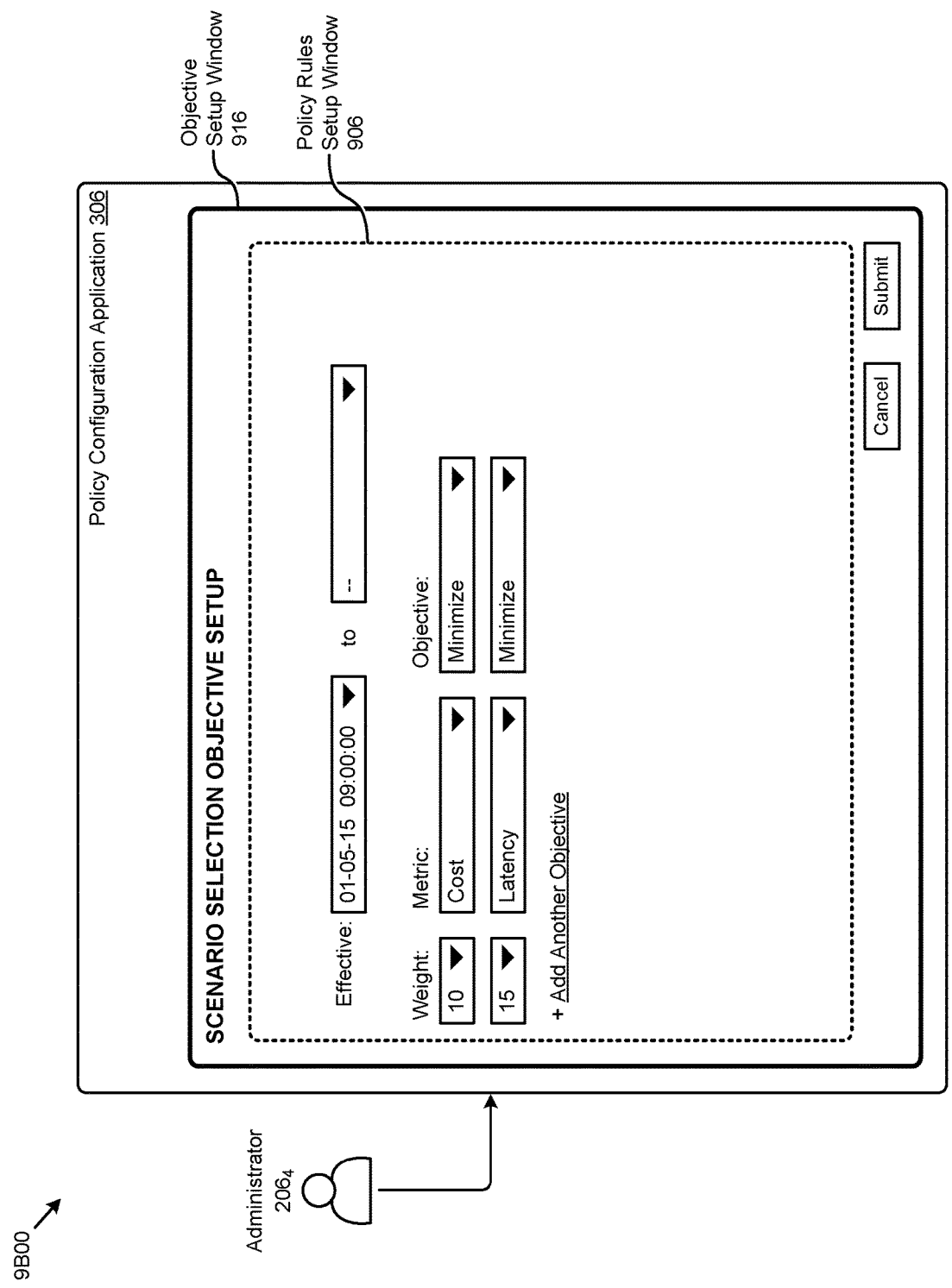
FIG. 9B exemplifies an objective specification user interface for specifying objectives in systems for accessing cloud-based content management resources using source-aware storage policies, according to some embodiments.

FIG. 9B exemplifies an objective specification user interface 9B00 for specifying objectives in systems for accessing cloud-based content management resources using source-aware storage policies. As an option, one or more instances of objective specification user interface 9B00 or any aspect thereof may be implemented in the context of the architecture and functionality of the embodiments described herein. The objective specification user interface 9B00 or any aspect thereof may be implemented in any desired environment.

Specifically, the objective specification user interface 9B00 shown in FIG. 9B can be used by an administrator 206$_4$ to establish the objectives used to select object processing scenarios according to the herein disclosed techniques. More specifically, the objective specification user interface 9B00 can comprise a policy rules setup window 906 that is part of the policy configuration application 306. As shown, the objective setup window 916 can present various input entry elements (e.g., dropdown selections, text boxes, etc.) through which the administrator 206$_4$ can specify certain characteristics of objectives that can be used to compare and/or select the object processing scenarios. For example, the metric (e.g., "Cost", "Latency", etc.) and a corresponding objective (e.g., "Minimize", Maximize, etc.) can be specified. A weight for each objective can further be established to facilitate forming the objective function to relate the various objectives. As shown in the example of FIG. 9B, the cost and latency objective have an equal weighting. Objective setup window 916 can also facilitate specification of an effective time period during which the listed objectives can be used to facilitate selection of the object processing scenarios.

Additional Embodiments of the Disclosure

Additional Practical Application Examples

Figure 10A:
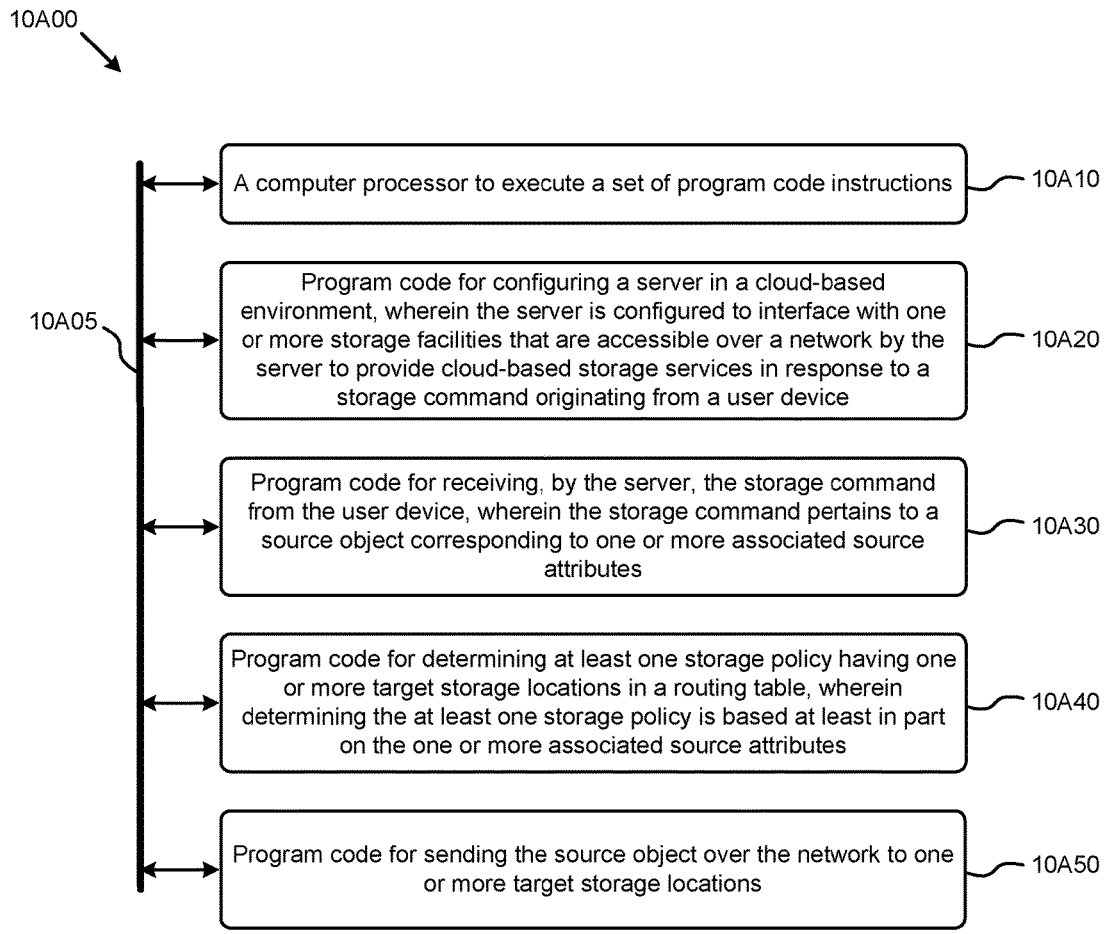
FIG. 10A and FIG. 10B depict system components as arrangements of computing modules that are interconnected so as to implement certain of the herein-disclosed embodiments.

FIG. 10A depicts a system 10A00 as an arrangement of computing modules that are interconnected so as to operate cooperatively to implement certain of the herein-disclosed embodiments. The partitioning of system 10A00 is merely illustrative and other partitions are possible. As an option, the present system 10A00 may be implemented in the context of the architecture and functionality of the embodiments described herein. Of course, however, the system 10A00 or any operation therein may be carried out in any desired environment.

The system 10A00 comprises at least one processor and at least one memory, the memory serving to store program instructions corresponding to the operations of the system. As shown, an operation can be implemented in whole or in part using program instructions accessible by a module. The modules are connected to a communication path 10A05, and any operation can communicate with other operations over communication path 10A05. The modules of the system can, individually or in combination, perform method operations within system 10A00. Any operations performed within system 10A00 may be performed in any order unless as may be specified in the claims.

The shown embodiment implements a portion of a computer system, presented as system 10A00, comprising a computer processor to execute a set of program code instructions (module 10A10) and modules for accessing memory to hold program code instructions to perform: configuring a server in a cloud-based environment, wherein the server is configured to interface with one or more storage facilities that are accessible over a network by the server to provide cloud-based storage services in response to a storage command originating from a user device (module 10A20); receiving, by the server, the storage command from the user device, wherein the storage command pertains to a source object corresponding to one or more associated source attributes (module 10A30); determining at least one storage policy having one or more target storage locations in a routing table, wherein determining the at least one storage policy is based at least in part on the one or more associated source attributes (module 10A40); and sending the source object over the network to one or more target storage locations (module 10A50).

Figure 10B:
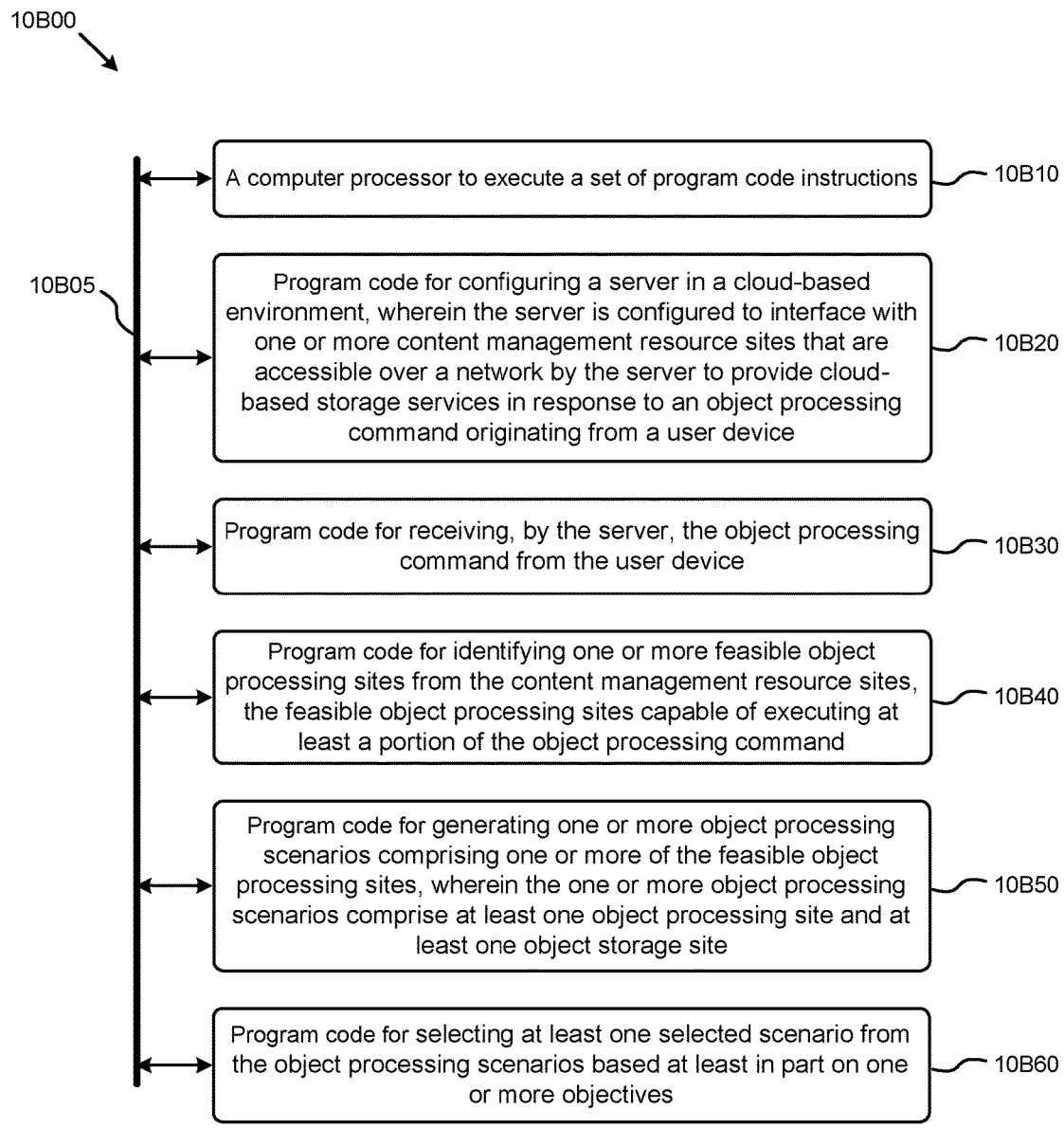

FIG. 10B depicts a system 10B00 as an arrangement of computing modules that are interconnected so as to operate cooperatively to implement certain of the herein-disclosed embodiments. The partitioning of system 10B00 is merely illustrative and other partitions are possible. As an option, the system 10B00 may be implemented in the context of the architecture and functionality of the embodiments described herein. Of course, however, the system 10B00 or any operation therein may be carried out in any desired environment.

The system 10B00 comprises at least one processor and at least one memory, the memory serving to store program instructions corresponding to the operations of the system. As shown, an operation can be implemented in whole or in part using program instructions accessible by a module. The modules are connected to a communication path 10B05, and any operation can communicate with other operations over communication path 10B05. The modules of the system can, individually or in combination, perform method operations within system 10B00. Any operations performed within system 10B00 may be performed in any order unless as may be specified in the claims.

The shown embodiment implements a portion of a computer system, presented as system 10B00, comprising a computer processor to execute a set of program code instructions (module 10B10) and modules for accessing memory to hold program code instructions to perform: configuring a server in a cloud-based environment, wherein the server is configured to interface with one or more content management resource sites that are accessible over a network by the server to provide cloud-based storage services in response to an object processing command originating from a user device (module 10B20); receiving, by the server, the object processing command from the user device (module 10B30); identifying one or more feasible object processing sites from the content management resource sites, the feasible object processing sites capable of executing at least a portion of the object processing command (module 10B40); generating one or more object processing scenarios comprising one or more of the feasible object processing sites, wherein the one or more object processing scenarios comprise at least one object processing site and at least one object storage site (module 10B50); and selecting at least one selected scenario from the object processing scenarios based at least in part on one or more objectives (module 10B60).

System Architecture Overview

Additional System Architecture Examples

Figure 11A:
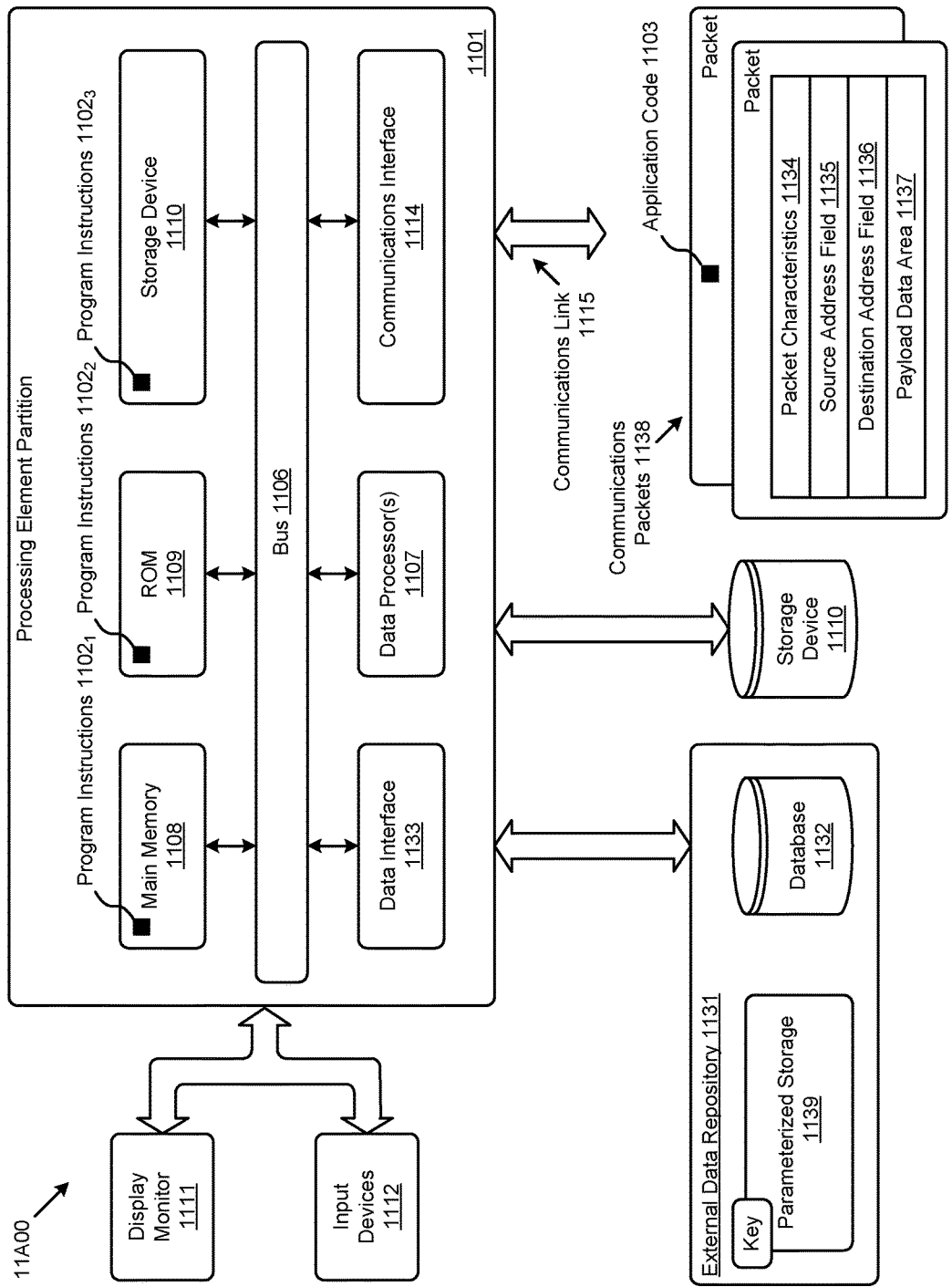
FIG. 11A and FIG. 11B depict exemplary architectures of components suitable for implementing embodiments of the present disclosure, and/or for use in the herein-described environments.

FIG. 11A depicts a block diagram of an instance of a computer system 11A00 suitable for implementing embodiments of the present disclosure. Computer system 11A00 includes a bus 1106 or other communication mechanism for communicating information. The bus interconnects subsystems and devices such as a CPU, or a multi-core CPU (e.g., data processor 1107), a system memory (e.g., main memory 1108, or an area of random access memory RAM), a non-volatile storage device or non-volatile storage area (e.g., ROM 1109), an internal or external storage device 1110 (e.g., magnetic or optical), a data interface 1133, a communications interface 1114 (e.g., PHY, MAC, Ethernet interface, modem, etc.). The aforementioned components are shown within processing element partition 1101, however other partitions are possible. The shown computer system 11A00 further comprises a display 1111 (e.g., CRT or LCD), various input devices 1112 (e.g., keyboard, cursor control), and an external data repository 1131.

According to an embodiment of the disclosure, computer system 11A00 performs specific operations by data processor 1107 executing one or more sequences of one or more program code instructions contained in a memory. Such instructions (e.g., program instructions $1102_1$, program instructions $1102_2$, program instructions $1102_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 11A00 performs specific networking operations using one or more instances of communications interface 1114. Instances of the communications interface 1114 may comprise one or more networking ports that are configurable (e.g., pertaining to speed, protocol, physical layer characteristics, media access characteristics, etc.) and any particular instance of the communications interface 1114 or port thereto can be configured differently from any other particular instance. Portions of a communication protocol can be carried out in whole or in part by any instance of the communications interface 1114, and data (e.g., packets, data structures, bit fields, etc.) can be positioned in storage locations within communications interface 1114, or within system memory, and such data can be accessed (e.g., using random access addressing, or using direct memory access DMA, etc.) by devices such as data processor 1107.

The communications link 1115 can be configured to transmit (e.g., send, receive, signal, etc.) any types of communications packets 1138 comprising any organization of data items. The data items can comprise a payload data area 1137, a destination address 1136 (e.g., a destination IP address), a source address 1135 (e.g., a source IP address), and can include various encodings or formatting of bit fields to populate the shown packet characteristics 1134. In some cases the packet characteristics include a version identifier, a packet or payload length, a traffic class, a flow label, etc. In some cases the payload data area 1137 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1107 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1131, which in turn can be formatted into any one or more storage areas, and which can comprise parameterized storage 1139 accessible by a key (e.g., filename, table name, block address, offset address, etc.).

Execution of the sequences of instructions to practice certain embodiments of the disclosure are performed by a single instance of the computer system 11A00. According to certain embodiments of the disclosure, two or more instances of computer system 11A00 coupled by a communications link 1115 (e.g., LAN, PTSN, or wireless network) may perform the sequence of instructions required to practice embodiments of the disclosure using two or more instances of components of computer system 11A00.

The computer system 11A00 may transmit and receive messages such as data and/or instructions organized into a data structure (e.g., communications packets 1138). The data structure can include program instructions (e.g., application code 1103), communicated through communications link 1115 and communications interface 1114. Received program code may be executed by data processor 1107 as it is received and/or stored in the shown storage device or in or upon any other non-volatile storage for later execution. Computer system 11A00 may communicate through a data interface 1133 to a database 1132 on an external data repository 1131. Data items in a database can be accessed using a primary key (e.g., a relational database primary key).

The processing element partition 1101 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1107. Some embodiments include one or more special-purpose hardware components (e.g., power control, logic, sensors, transducers, etc.). A module may include one or more state machines and/or combinational logic used to implement or facilitate the performance characteristics of techniques for accessing cloud-based content management resources using source-aware storage policies.

Various implementations of the database 1132 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of accessing cloud-based content management resources using source-aware storage policies). Such files or records can be brought into and/or stored in volatile or non-volatile memory.

Figure 11B:
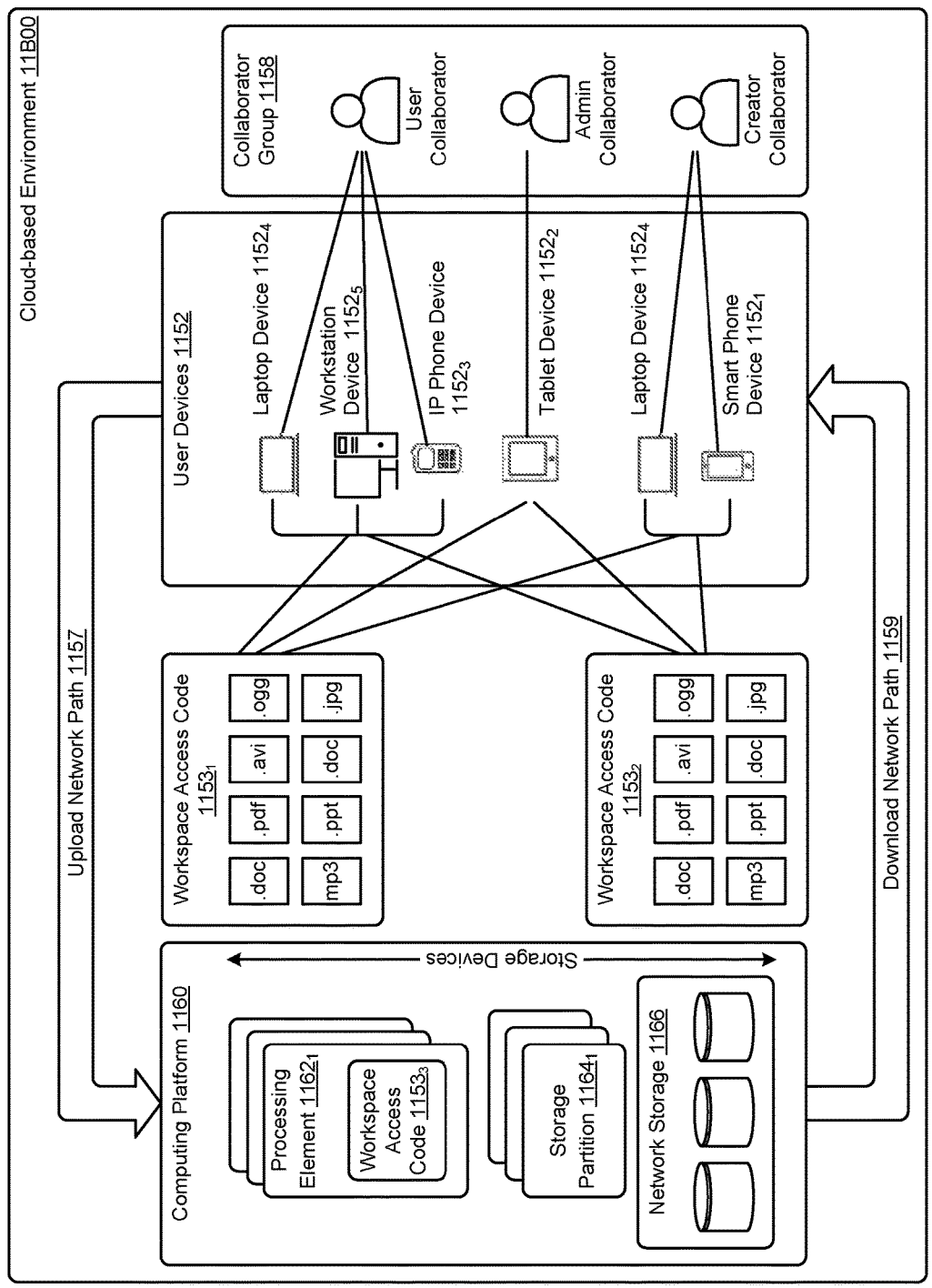

FIG. 11B depicts a block diagram of an instance of a cloud-based environment 11B00. Such a cloud-based environment supports access to workspaces through the execution of workspace access code (e.g., workspace access code $1153_1$ and workspace access code $1153_2$. Workspace access code can be executed on any of the shown user devices 1152 (e.g., laptop device $1152_4$, workstation device $1152_5$, IP phone device $1152_3$, tablet device $1152_2$, smart phone device $1152_1$, etc.). A group of users can form a collaborator group 1158, and a collaborator group can be composed of any types or roles of users. For example, and as shown, a collaborator group can comprise a user collaborator, an administrator collaborator, a creator collaborator, etc. Any user can use any one or more of the user devices, and such user devices can be operated concurrently to provide multiple concurrent sessions and/or other techniques to access workspaces through the workspace access code.

A portion of workspace access code can reside in and be executed on any user device. A portion of the workspace access code can reside in and be executed on any computing platform (e.g., computing platform 1160), including in a middleware setting. As shown, a portion of the workspace access code (e.g., workspace access code $1153_3$) resides in and can be executed on one or more processing elements (e.g., processing element $1162_1$). The workspace access code can interface with storage devices such the shown networked storage 1166. Storage of workspaces and/or any constituent files or objects, and/or any other code or scripts or data can be stored in any one or more storage partitions (e.g., storage partition $1164_1$). In some environments, a processing element includes forms of storage such as RAM and/or ROM and/or FLASH, and/or other forms of volatile and non-volatile storage.

A stored workspace can be populated via an upload (e.g., an upload from a user device to a processing element over an upload network path 1157). One or more constituents of a stored workspace can be delivered to a particular user and/or shared with other particular users via a download (e.g., a download from a processing element to a user device over a download network path 1159).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
    configuring a server in a cloud-based environment, wherein the server is configured to interface with one or more content management resource sites that are accessible over a network by the server to provide cloud-based storage services in response to an object processing command;
    receiving, by the server, the object processing command comprising at least one object processing activity and at least one object storage activity;
    identifying a policy that pertains to selection of both an object processing site and an object storage site; and
    processing the object processing command based at least in part on the policy to produce an object processing sequence, wherein a first operation of the object processing sequence is performed at the object processing site and a second operation of the object processing sequence is performed at the object storage site, the object processing site and the object storage site being different sites, the selection of both the object processing site and the object storage site is performed by:
        determining, based at least in part on the first operation of the object processing sequence and the policy, by a first evaluation of one or more first metrics pertaining to one or more object processing sites, one or more feasible object processing sites capable of executing at least a portion of the object processing activity, and
        determining, based at least in part on the second operation of the object processing sequence and the policy, by a second evaluation of one or more second metrics pertaining to one or more object storage sites, one or more feasible object storage sites capable of executing at least a portion of the object storage activity, wherein the determining of the one or more feasible object processing sites is performed independently from the determining of the one or more feasible object storage sites.

2. The method of claim 1, further comprising generating one or more object processing scenarios wherein the one or more object processing scenarios comprise at least one object processing site and at least one object storage site.

3. The method of claim 2, further comprising selecting at least one selected scenario from the object processing scenarios, the selecting being based at least in part on one or more objectives.

4. The method of claim 3, further comprising determining one or more predicted object processing metrics for at least some of the object processing scenarios.

5. The method of claim 4, wherein the predicted object processing metrics pertain to at least one of, a cost, or a latency, or an availability or any combination thereof.

6. The method of claim 4, wherein the objectives correspond to a respective one of the predicted object processing metrics.

7. The method of claim 6, further comprising scoring the object processing scenarios, wherein the scoring is based at least in part on at least one of the predicted object processing metrics.

8. The method of claim 6, further comprising comparing at least some of the object processing scenarios according to the predicted object processing metrics.

9. The method of claim 1, wherein evaluation of the feasible object processing sites is based at least in part on at least one of, a storage object data type, or a nature of derived data of the storage object.

10. The method of claim 9, wherein determining one or more feasible object storage sites further comprises determining a data storage site independently from determining a site to store the derivative data of the storage object.

11. The method of claim 1, wherein a first processing site of the one or more object processing sites at a first geographical location executes a first processing activity and a second processing site of the one or more object processing sites at a second geographical location is restricted from executing the first processing activity, the second processing site being restricted from executing the first processing activity based at least in part on one or more policies pertaining to the second geographical location, the second geographical location being different than the first geographical location.

12. The method of claim 1, wherein the cloud-based environment comprises a plurality of regions, the plurality of regions comprising:
    a first region having a first set of compute sites and storage sites, and
    a second region having a second set of compute sites and storage sites, wherein the policy restricts the object processing activity and the object storage activity to the first region.

13. The method of claim 1, wherein an engine is configured to:
    receive the object processing command,
    receive source attributes corresponding to an object of the object processing command,
    identify the policy to apply from one or more policies based at least in part on the object processing command and the source attributes, and
    generate both storage commands for the object storage site and feasible object processing sites for selecting the object processing site, based at least in part on the policy identified.

14. The method of claim 1, wherein the policy is associated with a metadata, the metadata comprising a data structure that references both a storage location and a processing location.

15. A computer readable medium, embodied in a non-transitory computer readable medium, the non-transitory computer readable medium having stored thereon a sequence of instructions which, when stored in memory and executed by one or more processors causes the one or more processors to perform a set of acts the acts comprising:
    configuring a server in a cloud-based environment, wherein the server is configured to interface with one or more content management resource sites that are accessible over a network by the server to provide cloud-based storage services in response to an object processing command;
    receiving, by the server, the object processing command comprising at least one object processing activity and at least one object storage activity;
    identifying a policy that pertains to selection of both an object processing site and an object storage site; and
    processing the object processing command based at least in part on the policy to produce an object processing sequence, wherein a first operation of the object processing sequence is performed at the object processing site and a second operation of the object processing sequence is performed at the object storage site, the object processing site and the object storage site being different sites, the selection of both the object processing site and the object storage site is performed by:
        determining, based at least in part on the policy, by a first evaluation of one or more first metrics pertaining to one or more object processing sites, one or more feasible object processing sites, the one or more feasible object processing sites capable of executing at least a portion of the object processing activity, and
        determining, based at least in part on the policy, by a second evaluation of one or more second metrics pertaining to one or more object storage sites, one or more feasible object storage sites, the one or more feasible object storage sites capable of executing at least a portion of the object storage activity, wherein the determining of the one or more feasible object processing sites is performed independently from the determining the one or more feasible object storage sites.

16. The computer readable medium of claim 15, further comprising instructions which, when stored in memory and executed by the one or more processors causes the one or more processors to perform acts of generating one or more object processing scenarios wherein the one or more object processing scenarios comprise at least one object processing site and at least one object storage site.

17. The computer readable medium of claim 16, further comprising instructions which, when stored in memory and executed by the one or more processors causes the one or more processors to perform acts of selecting at least one selected scenario from the object processing scenarios, the selecting being based at least in part on one or more objectives.

18. The computer readable medium of claim 17, further comprising instructions which, when stored in memory and executed by the one or more processors causes the one or more processors to perform acts of determining one or more predicted object processing metrics for at least some of the object processing scenarios.

19. The computer readable medium of claim 18, wherein the predicted object processing metrics pertain to at least one of, a cost, or a latency, or an availability or any combination thereof.

20. The computer readable medium of claim 18, wherein the objectives correspond to a respective one of the predicted object processing metrics.

21. The computer readable medium of claim 20, further comprising instructions which, when stored in memory and executed by the one or more processors causes the one or more processors to perform acts of scoring the object processing scenarios, wherein the scoring is based at least in part on at least one of the predicted object processing metrics.

22. The computer readable medium of claim 15, wherein the cloud-based environment comprises a plurality of regions, the plurality of regions comprising:
    a first region having a first set of compute sites and storage sites, and
    a second region having a second set of compute sites and storage sites, wherein the policy restricts the object processing activity and the object storage activity to the first region.

23. The computer readable medium of claim 15, wherein an engine is configured to:

receive the object processing command, receive source attributes corresponding to an object of the object processing command, identify the policy to apply from one or more policies based at least in part on the object processing command and the source attributes, and generate both storage commands for the object storage site and feasible object processing sites for selecting the object processing site, based at least in part on the policy identified.

24. The computer readable medium of claim 15, wherein the policy is associated with a metadata, the metadata comprising a data structure that references both a storage location and a processing location.

25. A system comprising:

a non-transitory storage medium having stored thereon a sequence of instructions; and one or more processors that execute the instructions to cause the one or more processors to perform a set of acts, the acts comprising, configuring a server in a cloud-based environment, wherein the server is configured to interface with one or more content management resource sites that are accessible over a network by the server to provide cloud-based storage services in response to an object processing command;

receiving, by the server, the object processing command comprising at least one object processing activity and at least one object storage activity;

identifying a policy that pertains to selection of both an object processing site and an object storage site; and processing the object processing command based at least in part on the policy to produce an object processing sequence, wherein a first operation of the object processing sequence is performed at the object processing site and a second operation of the object processing sequence is performed at the object storage site, the object processing site and the object storage site being different sites, the selection of both the object processing site and the object storage site is performed by:

determining, based at least in part on the policy, by a first evaluation of one or more first metrics pertaining to one or more object processing sites, one or more feasible object processing sites, the one or more feasible object processing sites capable of executing at least a portion of the object processing activity, wherein a first processing site of the one or more object processing sites at a first geographical location executes a first processing activity and a second processing site of the one or more object processing sites at a second geographical location is restricted from executing the first processing activity, the second processing site being restricted from executing the first processing activity based at least in part on one or more policies pertaining to the second geographical location, the second geographical location being different than the first geographical location; and determining, based at least in part on the policy, by a second evaluation of one or more second metrics pertaining to one or more object storage sites, one or more feasible object storage sites, the one or more feasible object storage sites capable of executing at least a portion of the object storage activity, wherein the determining of the one or more feasible object processing sites is performed independently from the determining of the one or more feasible object storage sites.

26. The system of claim 25, further comprising generating one or more object processing scenarios wherein the one or more object processing scenarios comprise at least one object processing site and at least one object storage site.

27. The system of claim 25, wherein the cloud-based environment comprises a plurality of regions, the plurality of regions comprising:

a first region having a first set of object processing sites and object storage sites, and a second region having a second set of object processing sites and object storage sites, wherein the policy restricts the object processing activity and the object storage activity to the first region.

28. The system of claim 25, wherein an engine is configured to:

receive the object processing command, receive source attributes corresponding to an object of the object processing command, identify the policy to apply from one or more policies based at least in part on the object processing command and the source attributes, and generate both storage commands for the object storage site and feasible object processing sites for selecting the object processing site, based at least in part on the policy identified.

29. The system of claim 25, wherein the policy is associated with a metadata, the metadata comprising a data structure that references both a storage location and a processing location.

* * * * *